US011503120B2

(12) United States Patent
Nygren

(10) Patent No.: US 11,503,120 B2
(45) Date of Patent: Nov. 15, 2022

(54) AGRICULTURAL MONITORING SYSTEM AND METHOD

(71) Applicant: ÅLÖ AB, Umeå (SE)

(72) Inventor: Tomas Nygren, Umeå (SE)

(73) Assignee: ÅLÖ AB, Umeå (SE)

( * ) Notice: Subject to any disclaimer, the term of this patent is extended or adjusted under 35 U.S.C. 154(b) by 393 days.

(21) Appl. No.: 16/670,597

(22) Filed: Oct. 31, 2019

(65) Prior Publication Data

US 2020/0068023 A1 Feb. 27, 2020

Related U.S. Application Data

(63) Continuation of application No. PCT/SE2018/050450, filed on May 2, 2018.

(30) Foreign Application Priority Data

May 4, 2017 (SE) .................................... 1750540-5

(51) Int. Cl.
*G01S 19/14* (2010.01)
*H04L 67/12* (2022.01)
(Continued)

(52) U.S. Cl.
CPC ............ *H04L 67/12* (2013.01); *A01K 29/005* (2013.01); *E02F 3/96* (2013.01); *E02F 9/2025* (2013.01);
(Continued)

(58) Field of Classification Search
CPC ............ G01S 19/14; G05D 1/00; H04L 29/08
See application file for complete search history.

(56) References Cited

U.S. PATENT DOCUMENTS 5,067,572 A 11/1991 Kyrtsos et al.
5,850,341 A * 12/1998 Fournier ............... E02F 9/2045
701/34.2
(Continued)

FOREIGN PATENT DOCUMENTS

EP 1346622 A1 9/2003
EP 2011390 A1 1/2009
(Continued)

OTHER PUBLICATIONS

International Search Report and Written Opinion for Application No. PCT/SE2018/050450, dated Jul. 13, 2018, 15 pages.
(Continued)

*Primary Examiner* — Tan Q Nguyen
(74) *Attorney, Agent, or Firm* — Dinsmore & Shohl LLP

(57) ABSTRACT

The present disclosure relates to an agricultural monitoring system and method for monitoring a nutrient flow within an agricultural site. The method comprises the steps of detecting a quantity related to a carried material of a known material type; determining a nutrient content of the captured material based on the detected quantity and based on at least one nutrient content parameter value associated with the carried material; obtaining information related to a source location and a target location for the carried material, and forming information related to the nutrient flow, said information comprising the source location, the target location, information related to the determined nutrient content of the carried material and preferably material type of the carried material.

32 Claims, 15 Drawing Sheets

(51) Int. Cl.
*A01K 29/00* (2006.01)
*E02F 3/96* (2006.01)
*E02F 9/20* (2006.01)
*E02F 9/26* (2006.01)
*G01G 5/04* (2006.01)
*G01G 19/08* (2006.01)
*G07C 5/08* (2006.01)
*G05D 1/00* (2006.01)
*B62D 49/06* (2006.01)

(52) U.S. Cl.
CPC ............ *E02F 9/26* (2013.01); *G01G 5/04* (2013.01); *G01G 19/083* (2013.01); *G01S 19/14* (2013.01); *G07C 5/0841* (2013.01); *B62D 49/06* (2013.01)

(56) References Cited

U.S. PATENT DOCUMENTS

| | | | | |
|---|---|---|---|---|
| 6,047,227 A | * | 4/2000 | Henderson | ............ E02F 9/2045 701/50 |
| 6,208,925 B1 | * | 3/2001 | Creger | .................... E02F 3/434 172/3 |
| 2007/0150147 A1 | * | 6/2007 | Rasmussen | ........... E01C 19/004 701/50 |
| 2008/0208415 A1 | * | 8/2008 | Vik | ......................... E21C 41/26 701/50 |
| 2011/0320033 A1 | | 12/2011 | Bresciani | |
| 2014/0095032 A1 | * | 4/2014 | Mulder | .................. G01G 13/02 701/50 |
| 2014/0180547 A1 | * | 6/2014 | Edara | ................... G05D 1/0278 701/50 |

FOREIGN PATENT DOCUMENTS

| | | |
|---|---|---|
| WO | 2014151398 A1 | 9/2014 |
| WO | 2014199354 A1 | 12/2014 |

OTHER PUBLICATIONS

Swedish Search Report for Patent Application No. 1750540-5, dated Jan. 16, 2018, 2 pages.

* cited by examiner

Fig 6

| Work equipment ID | Implement ID | Source location | Target location | Material type | Stock state source location | Stock state target location | Nutrient content | Material handling activity(-ies) |
|---|---|---|---|---|---|---|---|---|
|  |  |  |  |  |  |  |  |  |
|  |  |  |  |  |  |  |  |  |
|  |  |  |  |  |  |  |  |  |
|  |  |  |  |  |  |  |  |  |

Fig 7

| Work activity | Material type | Nutrient content scheme |
|---|---|---|
| Bale handling | Straw bales | Dry Matter (DM) - (%) |
| | Hay bales | Crude Protein (CP) - (%) |
| | Haylage bales | Acid Detergent Fiber (ADF) - (%) |
| | Silage bales | Neutral detergent Fiber - (NDF) |
| Silage handling | Silage | Crude Fat – (%) |
| | | Ash – (%) |
| Grain handling | Rye | Starch – (%) |
| | Barley | |
| | Wheat | |
| | Oat | |
| Forage handling | Forage | |
| Manure handling | Manure | Dry matter- (%) |
| | | Nitrogen (N) - (%) |
| Fertilizer handling | Fertilizer | Phosphorous (P) – (%) |
| | | Potassium – (%) |

Fig 8

| Work activity flow | Activity selections and/or chains |
|---|---|
| Bale handling | Bailing |
| | Bale handling/loading |
| | Bale transport |
| | Bale splitting |
| Silage handling | Silage pit preparation |
| | Silage withdrawal |
| | Silage handling/loading |
| | Silage transport |
| Grain handling | Grain harvesting |
| | Grain transport |
| | Grain handling/loading |
| Forage handling | Forage mixing |
| | Feeding |
| Manure handling | Manure handling/loading |
| | Manure transport |
| | Manure spreading |
| Fertilizer handling | Fertilizer handling/loading |
| | Fertilizer transport |
| | Fertilizer spreading |

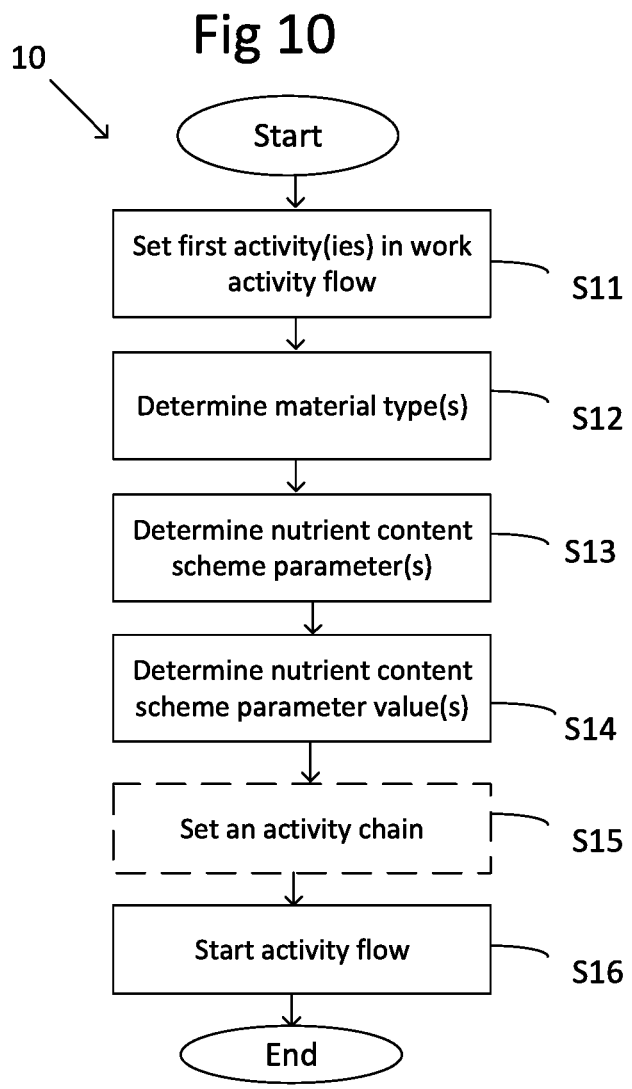

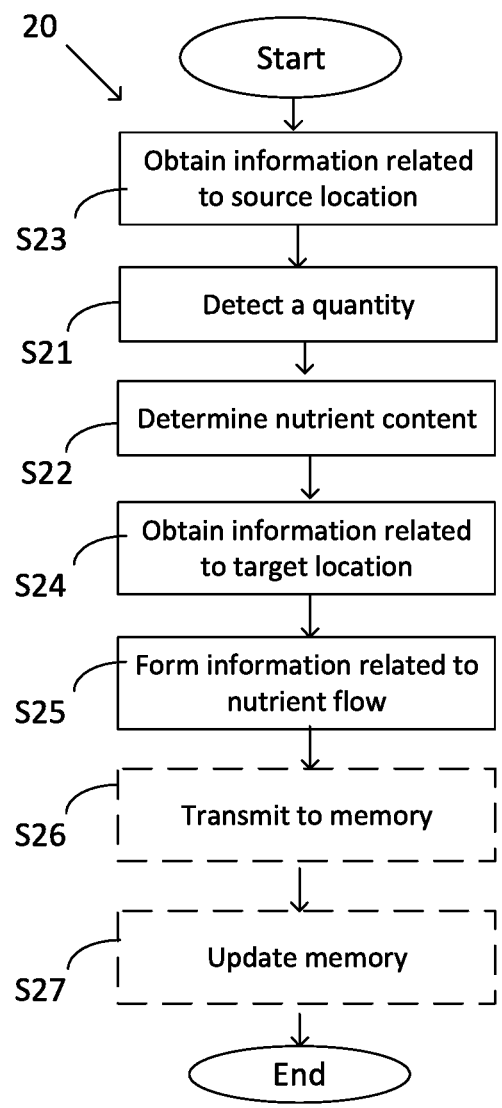

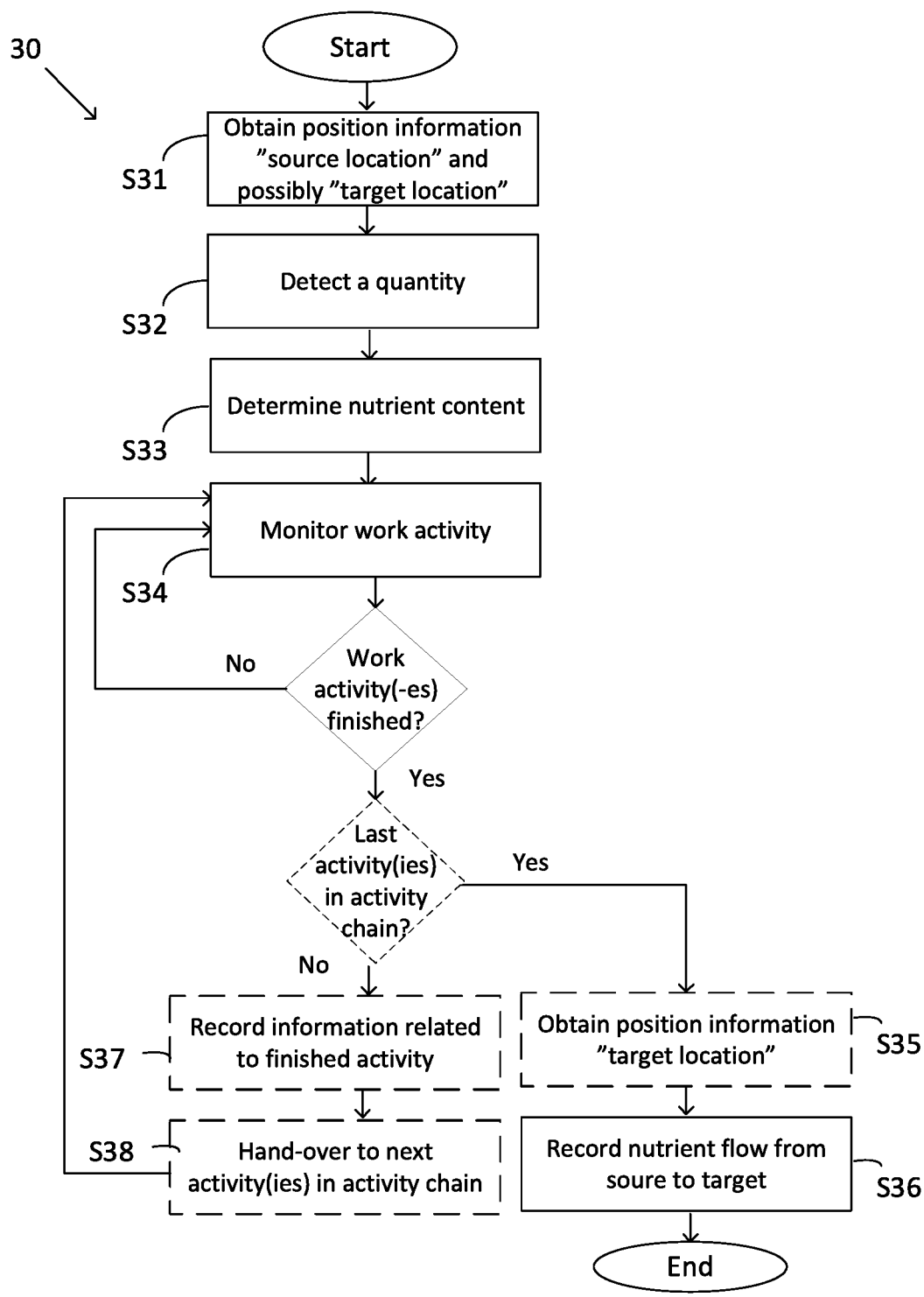

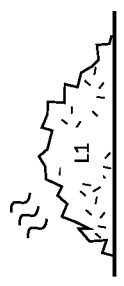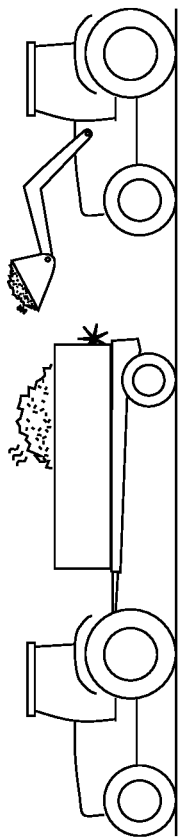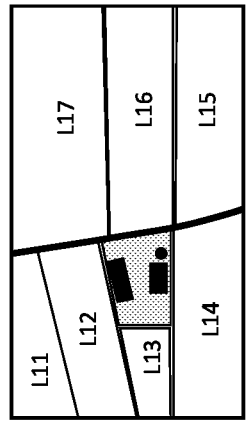
Fig 14

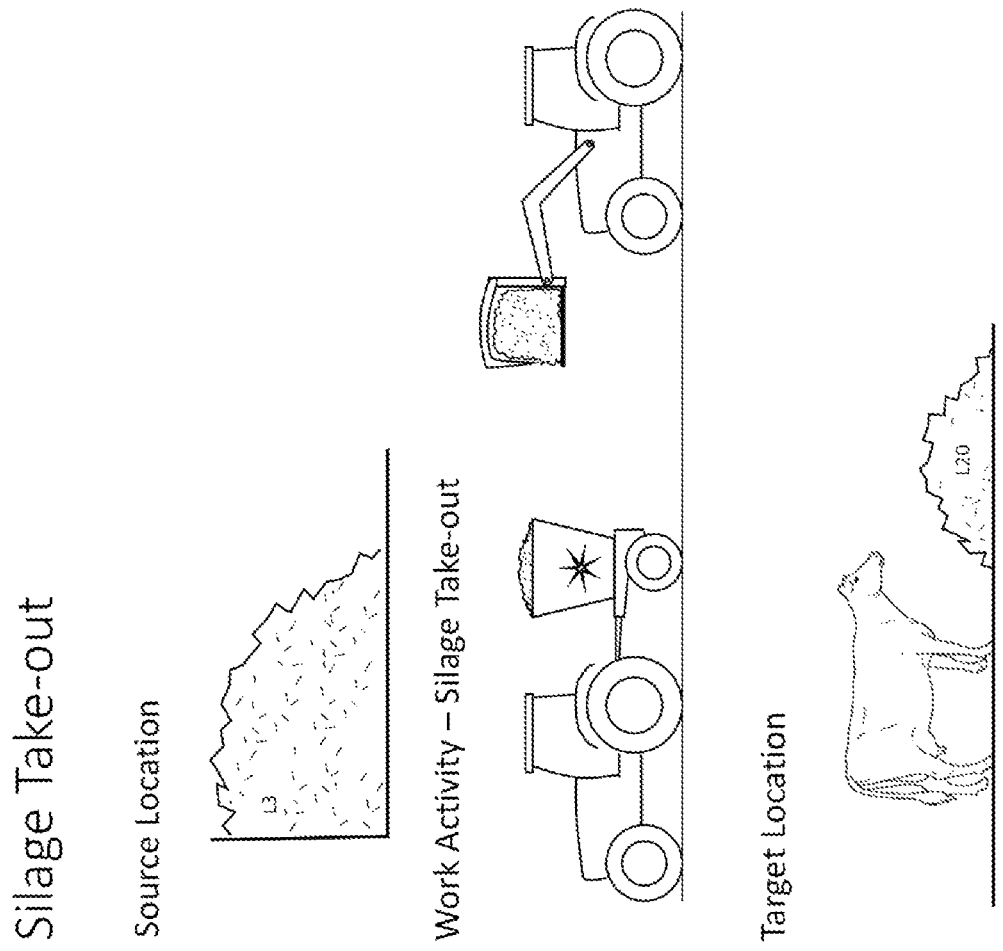

AGRICULTURAL MONITORING SYSTEM AND METHOD

RELATED APPLICATIONS

The present application is a continuation of PCT Application No. PCT/SE2018/050450 filed May 2, 2018, which claims priority to Swedish Application No. SE 1750540-5, filed May 4, 2017, all of which are hereby incorporated in their entirety by reference as set forth herein.

TECHNICAL FIELD

The present disclosure relates to an agricultural monitoring system and method for monitoring a nutrient flow within an agricultural site.

TECHNICAL BACKGROUND

There are today known in the art systems for controlling movement of material within a site to perform particular tasks. For example, it is known that many livestock enterprises and stock-farms prepare the ration of food to be administered to animal using a mixing unit consisting of a mixing wagon comprising a bin in which several food products are loaded by means of an external loader unit.

From US 2011/0320033 it is known a system for controlling loading of food products in a mixing unit by using a loader. The system has a weighing device which is mounted on the mixing unit and has a memory for storing at least one recipe of food products to be loaded. For each food product of the recipe, first geographic coordinates are associated with the food product. The first geographic coordinates identify a stocking are of the food product. A GPS receiver is associated with the loader unit to detect second geographic coordinates identifying the place in which the loader unit is located. A processing unit is configured to check the weight of the food products of the recipe as these are gradually loaded in the mixing unit, to acquire the second coordinate for each food product being loaded when the loader takes the food product from a stocking are and to compare the second geographic coordinates with the first geographic coordinates for each food product being loaded in order to verify that the correct food product is being taken.

SUMMARY

An object of the present disclosure is to obtain a system and method for nutrient management and monitoring.

This object has in accordance with one embodiment of the disclosure been solved by means of an agricultural monitoring system for monitoring a nutrient flow within an agricultural site. The agricultural monitoring system comprises at least one work equipment configured to perform at least one agricultural activity related to material carried by the work equipment, wherein the material is of one or a plurality of material types. Each work equipment comprises a quantity detection element arranged to detect a quantity related to the material carried by the work equipment;

The agricultural monitoring system comprises further a memory configured to store information related to the nutrient flow. The memory is arranged to store a plurality of defined locations located within the agricultural site. Each location is associated with a geographical coordinate and/or geographical zone. Each location is arranged to accommodate material of at least one material type. The memory is further arranged to for each location store information related to a current nutrient stock state related to said at least one material type.

The agricultural monitoring system comprises further a user interface and a control element configured to communicate with said user interface. The control element is arranged to receive from the quantity detection element a quantity related to the material carried by the work equipment, determine the nutrient content of the carried material based on the detected quantity and based on a nutrient content parameter value associated with the carried material, receive information related to a source location and a target location for the carried material, said source location being one or a plurality of the defined locations and said target location being one or a plurality of the defined locations, and transmit information to the memory related to the nutrient flow, said information comprising the source location, the target location, information related to the determined nutrient content of the carried material, and preferably material type of the carried material.

The carried material may be associated with a nutrient content parameter comprising at least one of the following: crude protein, acid detergent fiber, neutral detergent fiber, crude fat, ash, starch, nitrogen, phosphorus and potassium.

The nutrient content parameter may comprise at least one of the following: crude protein, acid detergent fiber, neutral detergent fiber, crude fat, ash, and starch when the carried material is straw, hay, haylage, silage, grain or forage, or nitrogen, phosphorus and potassium when the carried material is manure or fertilizer.

The at least one nutrient content parameter value may be selected based on user input, obtained sensor data and possible processing thereof or intelligence based on collected data, or a combination thereof.

Knowledge of the flow of material and nutrient at a farm is essential for optimizing operation at the farm. The flow of nutrients such as crude protein, acid detergent fiber, neutral detergent fiber, crude fat, ash, starch, nitrogen, phosphorus and potassium s at the farmer's site can then be controlled.

The respective nutrient is herein defined as nutrient content parameter. Each nutrient content parameter is associated to at least one nutrient content parameter value. The nutrient content parameter value is characteristically indicated as a percentage. The percentage is for example a weight percentage.

Analysis of nutrient content is characteristically made by the following step. In a first step, a sample of the material for analysis is provided. Thereupon the sample is analysed. The analysis may be performed by means of a lab analysis. The sample is then sent to a lab which carries out the analysis. Alternatively, the analysis is performed by means of a stationary or portable instrument at the farmer's site. Alternatively, the analysis is performed in real time by sensors mounted at the implement or tool attached thereto. In the latter case, the analysis may be made simultaneously with weighting of the material. The at least one nutrient content parameter value may in practice at least for some materials be obtained by means of analysis using a NIR spectroscopy based instrument. The instrument may as discussed above be a stationary instrument, portable instrument or an implement or tool mounted instrument. The analysis may be made at the instrument or at a distance location. Analysis may for example be performed online.

At least when it comes to manure, the determination of nutrient content parameter values may be made in an alternative way. For example, the farmer can make a calculation with regard to manure and determine the nutrient content in the manure based on for examples which kind(s) of animals are at the farm.

In a next step, the obtained nutrient content parameter values is provided at the system. This may be made by user input. Alternatively, the analyser communicates directly or over the cloud with the system. Accordingly, the obtained nutrient content parameter values may then be automatically provided to the system. The relevant nutrient parameter values related to the analysed material may be stored in the memory. The relevant nutrient parameter values may be stored in the memory together with timing information, such as date, indicating when the material was harvested or otherwise obtained. The timing information may be automatically generated by the software, by the nutrient analyser, or by manual input. The relevant nutrient parameter values may instead or in addition thereto be stored in the memory together with coordinate information indicating the location where the material was harvested or otherwise obtained.

As is understood from the above, each nutrient content parameter may be associated to a plurality of nutrient content parameter values. As is also understood from above, each nutrient content parameter value may be associated to a location and/or date. When a plurality of nutrient content parameter values are available for selection, one value may be selected. The farmer may then make the selection by means of user input. Alternatively, the selection is automated or semi-automated. For example, that nutrient content parameter value which has the latest date and/or being associated to a closest location may be selected or recommended to the user for selection. Other calculations such as averaging of a plurality of nutrient content parameter values may be considered when selecting nutrient content parameter value or recommending nutrient content parameter value for selection.

As is clear from above, the user input may include input of the nutrient content parameter value for use in determining the nutrient content relating to the carried material or input of a selection of one nutrient parameter value among alternatives as provided by the system.

In addition or instead, sensor data may be used for determining the nutrient content parameter value(s). The sensor data may for example be provided from an onboard instrument such as a NIR spectroscopy based instrument arranged to determine nutrient content parameter values, preferably in real time or close thereto. The sensor data may instead comprise a sensor arranged to obtain position information; the selection of nutrient parameter value(s) may then be made based thereupon the obtained position information.

Further, in addition or instead, intelligence based on collected data may be used for determining the nutrient content parameter values. For example, the intelligence may include selecting the most recent nutrient content parameter value. The intelligence may include more advanced functions such as collecting data relating to environmental conditions and to obtain an estimate of the nutrient content parameter value based on the data relating to the environmental conditions and based on nutrient content parameter values obtained from previously made analyses and corresponding environmental conditions relevant for that previously made nutrient content parameter value determination. For example, when a material is taken from a source location, such as harvested from a field, environmental parameters available for that harvest may involve at least one of the following:

amount of rain (water) and/or sun and/or nutrients which have been provided to the field during and/or before growth, type and/or quality of the soil, information related to whether it is the first, second or third etc. harvest of the year from that field, the maturity of the crops of the field (such as time since last harvest or time since sowing.

If associating this kind of data to determined nutrient content parameter values, nutrient content parameter values for subsequent material handling may be determined at least on part based on such information. Nutrient content parameter values for use may be determined for example by using machine learning.

As materials are transported at the site, the quantity of the transported material can be detected and the detected quantity can be combined with the calculated nutrient content of the transported material. Thereby, information related to interesting substances of the transported material is obtained. When adding information related to a source location and target location, the flow of those interesting substances at the farm can be followed and monitored. As any type of activities involving handling of nutrients on the farm can be recorded, the system can compile the material(s) and nutrient content moved to and from a particular location. The types of locations monitored using this system may include for example store locations for storage of materials for use at the farm, agricultural fields and feeding locations for feeding the animals at the farm.

The monitoring allows for monitoring and control of flows of nutrient within a site. For example, the output of nutrients from the respective source location field may be compared to the amounts of (different types of) nutrients added to the respective fields, and use of fertilizers and manure on the fields of the site may be optimized in accordance therewith.

Further, the amounts of nutrients fed to animals may be determined in real time and feeding may be stopped when a desired amount of nutrients has been taken out from a source location.

In different embodiments of the present disclosure, the target location may be different than the source location.

The memory may be arranged to, upon reception of information related to the nutrient flow, for the respective source and target location, update the content thereof with the received information related to the nutrient flow.

The at least one material type may comprise at least one of the following: straw, hay, haylage, silage, rye, barley, oat, forage, manure and fertilizer.

In different embodiments of the agricultural monitoring system, the quantity detection element comprises a weight determination element arranged to determine the weight of the material.

In different embodiments of the agricultural monitoring system, the quantity detection element comprises a cycle counter element arranged to detect an activity cycle performed by the work equipment and to count the number of detected activity cycles.

The user interface may comprise user input means. The control element may then be arranged to receive information related to the source location and the target location for the carried material obtained via the user input means.

In different embodiments of the agricultural monitoring system, the work equipment comprises a position obtaining element arranged to obtain the geographical position of the work equipment. The control element may then be arranged to receive position information from the position obtaining element and to determine the source position and or the target position based on the obtained position information. The control element may be arranged to receive position information from the position obtaining element related to the location at capture and/or release of the material by means of the work equipment.

In different embodiments of the agricultural monitoring system, the control element is arranged to process the determined nutrient content from a plurality of quantity detections to determine an aggregated nutrient content carried by the work equipment and to transmit the aggregated nutrient content information to the memory.

In different embodiments of the agricultural monitoring system, the memory is configured to contain information related to a stock state history and/or nutrient content associated to the respective stock state in the stock state history for each source and/or target location.

In different embodiments of the agricultural monitoring system, the user interface comprises input means for input of the material type of the material of a current activity.

In different embodiments of the agricultural monitoring system, each of the at least one work equipment has a work equipment communication interface connectable to a communication network, such as the internet.

The memory may be arranged at one of the work equipment or shared between a plurality of the work equipment and the at least one work equipment is arranged to transmit the information related to the nutrient flow to the memory via the communication network.

The agricultural monitoring system may further comprise a remote data storage and processing system. The remote data storage and processing system comprises a remote data storage and processing system communication interface connected to said communication network. The remote data storage and processing system is arranged to at least partly accommodate said memory or a copy thereof. In accordance therewith, the at least one work equipment is arranged to transmit the information related to the nutrient flow to the memory accommodated in the remote data storage and processing system.

The agricultural monitoring system comprises further in different embodiments an electronic user device. The electronic user device comprises an electronic user device communication interface for communication with said at least one work equipment communication interface and/or said remote data storage and processing system communication interface. The user interface may be at least partly located at or integrated within the electronic user device. The control element may be at least partly located at or integrated within the electronic user device.

The user interface may comprise a graphical user interface for display of the monitored nutrient flow. The graphical user interface may be arranged to display the nutrient flow between one or more source and target locations for example within a given time interval. The graphical user interface may be arranged to display a current nutrient content at one or a plurality of source and/or target locations. The graphical user interface may be arranged to present activities performed in relation to a nutrient flow from at least one source location to at least one target location.

The user interface may be arranged to receive user input information related to the material type of the carried material. For example, the user interface may be arranged to present a plurality of pre-selectable material types. One or a plurality of selectable material handling activities may be associated to each material type.

The user interface may be arranged to receive user input related to at least one material handling activity related to the carried material.

The information related to the nutrient flow transmitted to the memory may comprise an indication of said at least one activity.

The at least one activity may comprise at least one of bale handling, silage handling, grain handling, forage handling, manure handling, and fertilizer handling.

The user interface may be arranged to present a plurality of pre-selectable activities or activity chains.

Each activity may be associated to at least one selectable material type.

In different embodiments of the agricultural operating system, the user interface is arranged to receive user input for an activity target related to the quantity and/or nutrient content. The control element may be arranged to determine when the activity target has been reached. The user interface may be arranged to present information that the target has been reached.

In different embodiments of the present disclosure, the information related to the nutrient flow comprises the equipment ID code. Accordingly, the at least one work equipment may comprise an equipment identity tag indicative of the equipment ID code.

In different embodiments of the disclosure, the control element is located at or integrated within the work equipment and/or the remote data storage and processing system and/or the electronic user device.

In different embodiments of the disclosure, the user interface is located at or integrated within the work equipment and/or the remote data storage and processing system and/or the electronic user device.

In different embodiments of the disclosure, at least one work equipment is a work vehicle having a fastener for releasable fastening of an implement. The implement has an elongated arm. The elongated arm has a fastening arrangement arranged at a first part of the arm. The fastening arrangement is adapted for releasable fastening to said fastener. The implement further has an attachment arrangement connected to a second part of the arm. The attachment arrangement is adapted for releasable attachment of a work tool. The implement has a first hydraulic cylinder which, when actuated, is adapted to cause the implement to carry out a first function. The first function comprises movement of the arm in relation to the work vehicle when the implement is attached to the vehicle. The implement comprises further a first sensor adapted to generate a first signal indicative of a hydraulic pressure in said first hydraulic cylinder when said first hydraulic cylinder is actuated.

In different embodiments of the disclosure, the control element is arranged to determine the weight based on a known relation between the load weight and the hydraulic pressure and based on the signal obtained by the first sensor.

The control element may be at least partly arranged at the implement.

In different embodiments of the disclosure, the implement comprises the equipment identity tag indicative of the ID code. The information related to the nutrient flow may then comprise the implement ID code.

The present disclosure further relates to work equipment for performing agricultural activities, wherein the work equipment is arranged to carry material of at least one material type. The work equipment comprises a quantity detection element arranged to detect a quantity of the carried material. The work equipment comprises further a control element. The control element is arranged to receive from the quantity detection element a quantity related to the carried material. The control element is further arranged to determine the nutrient content of the captured material based on the detected quantity and based on a nutrient content parameter value associated with the carried material. The control element is further arranged to receive information related to a source location and a target location for the carried material. The control element is further arranged to transmit information to the memory related to the nutrient flow. The information comprises the source location, the target location, information related to the nutrient content of the carried material, and preferably material type of the carried material.

The carried material is associated with a nutrient content parameter which may comprise at least one of the following: crude protein, acid detergent fiber, neutral detergent fiber, crude fat, ash, and starch for example when the carried material is straw, hay, haylage, silage, grain or forage; or nitrogen, phosphorus and potassium for example when the carried material is manure or fertilizer. The at least one nutrient content parameter value is selected based on user input, obtained sensor data and possible processing thereof or intelligence based on collected data, or a combination thereof.

In different embodiments, the work equipment comprises a possible detachable implement. The implement may comprise at least a part of the control element.

Different embodiments of the present disclosure related to an implement attachable to work equipment for performing agricultural transporting activities. The implement is arranged to carry material of one or a plurality of material types. The implement comprises a quantity detection element arranged to detect a quantity of the carried material and a control element. The control element is arranged to receive from the quantity detection element a quantity related to the carried material, determine the nutrient content of the captured material based on the detected quantity and based on at least one nutrient content parameter value associated with the carried material, receive information related to a source location and a target location for the carried material, and transmit information to the memory related to the movement of the nutrient flow, said information comprising the source location, the target location, information related to the determined nutrient content of the carried material, and preferably the material type of the carried material.

The carried material is associated with a nutrient content parameter which may comprise at least one of the following: crude protein, acid detergent fiber, neutral detergent fiber, crude fat, ash, and starch for example when the carried material is straw, hay, haylage, silage, grain or forage; or nitrogen, phosphorus and potassium for example when the carried material is manure or fertilizer. The at least one nutrient content parameter value is selected based on user input, obtained sensor data and possible processing thereof or intelligence based on collected data, or a combination thereof.

The implement may be a loader such as a front loader.

Different embodiments of the present disclosure relates to a control element arranged to receive from a quantity detection element a detected quantity related to a carried material of a material type, determine the nutrient content of the captured material based on the detected quantity and based on at least one nutrient content parameter value associated with the carried material, receive information related to a source location and a target location for the carried material, and form information related to the nutrient flow, said information comprising the source location, the target location, information related to the determined nutrient content of the carried material, and preferably the material type of the carried material.

The carried material is associated with a nutrient content parameter which may comprise at least one of the following: crude protein, acid detergent fiber, neutral detergent fiber, crude fat, ash, and starch for example when the carried material is straw, hay, haylage, silage, grain or forage; or nitrogen, phosphorus and potassium for example when the carried material is manure or fertilizer. The at least one nutrient content parameter value is selected based on user input, obtained sensor data and possible processing thereof or intelligence based on collected data, or a combination thereof.

The present disclosure further relates to method for monitoring a nutrient flow within an agricultural site. The method comprises the steps of: detecting a quantity related to a carried material of a known material type; determining the nutrient content of the captured material based on the detected quantity and based on at least one nutrient content parameter value associated with the carried material; obtaining information related to a source location and a target location for the carried material; and forming information related to the nutrient flow, said information comprising the source location, the target location, and information related to nutrient content and preferably material type of the carried material. The carried material is associated with a nutrient content parameter which may comprise at least one of the following: crude protein, acid detergent fiber, neutral detergent fiber, crude fat, ash, and starch for example when the carried material is straw, hay, haylage, silage, grain or forage; or nitrogen, phosphorus and potassium for example when the carried material is manure or fertilizer. The at least one nutrient content parameter value is selected based on user input, obtained sensor data and possible processing thereof or intelligence based on collected data, or a combination thereof.

In different embodiments, the step of forming information related to the nutrient flow comprises comprising the detected quantity in the information.

In different embodiments, the method further comprises a step of transmitting the formed information related to the nutrient flow to a memory arranged to store a plurality of defined locations located within the agricultural site. Each defined location is associated with a geographical coordinate and/or geographical zone. The memory stores, for each location, information related to a current nutrient stock state related to said at least one material type.

In different embodiments, the method comprises a step of, upon reception of information related to the nutrient flow, for the respective source and target location, update the memory content with the received information related to the nutrient flow.

The source location may be one or a plurality of the defined locations and said target location may be one or a plurality of the defined locations.

BRIEF DESCRIPTION OF THE DRAWINGS

FIG. 6 illustrates schematically examples of memory content of a memory of an agricultural monitoring system for monitoring a nutrient flow.

FIG. 7 illustrates schematically an example of a chart for use in determination of nutrient content.

FIG. 8 illustrates schematically an example of a chart for selecting an activity or activity chain for use in monitoring of nutrient flow.

FIG. 10 is a flow chart illustrating an example of a method for initializing a work activity flow.

FIG. 11 is a flow chart illustrating an example of a method for monitoring a nutrient flow.

FIG. 12 is a flow chart illustrates an example of a method for monitoring activities in a nutrient flow from a source location to a target location.

FIG. 14 illustrates an example of a nutrient flow related to a manure handling application.

FIG. 15 illustrates an example of a nutrient flow related to a silage take-out application.

DETAILED DESCRIPTION OF EMBODIMENTS

Figure 1:
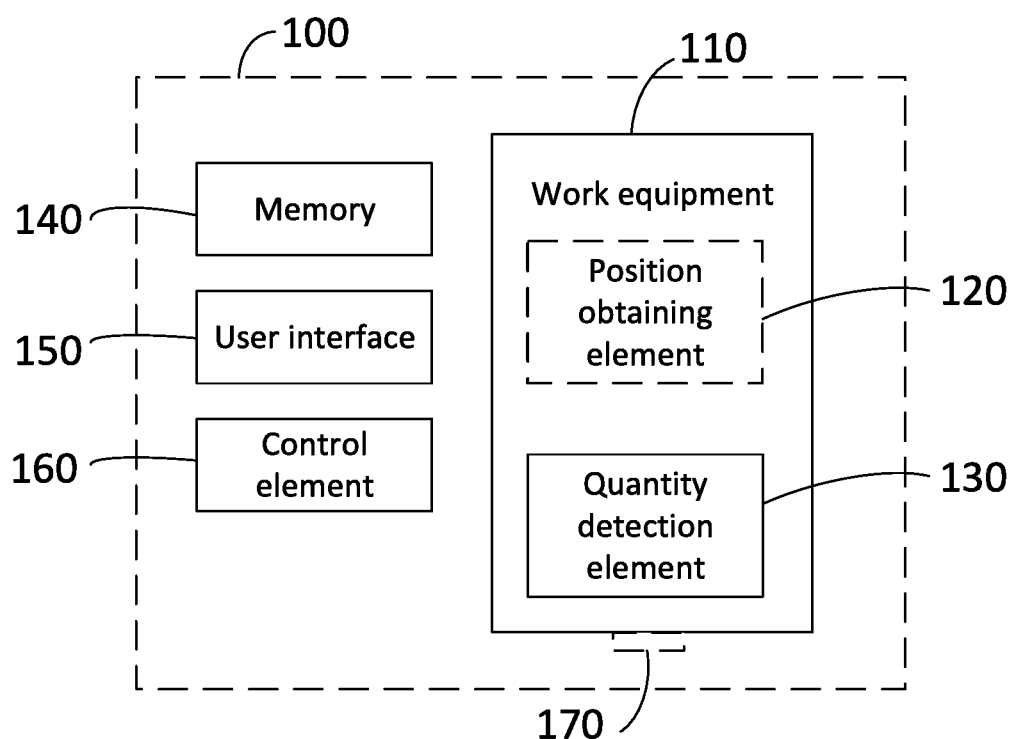
FIG. 1 is a block scheme illustrating an example of an agricultural monitoring system for monitoring a nutrient flow.

Embodiments of the present disclosure will be described more fully hereinafter with reference to the accompanying drawings. The apparatuses and methods disclosed herein can, however, be realized in many different forms and should not be construed as being limited to the embodiments set forth herein. Like numbers in the drawings refer to like elements throughout.

The terminology used herein is for the purpose of describing particular embodiments of the disclosure only, and is not intended to limit the disclosure. As used herein, the singular forms "a", "an" and "the" are intended to include the plural forms as well, unless the context clearly indicates otherwise.

FIG. 1 illustrates an example of an agricultural monitoring system 100 for monitoring a nutrient flow within an agricultural site. The site may be a farm. The site may be a plurality of farms. Further, a plurality of sites may be monitored by means of the agricultural monitoring system.

The system comprises at least one work equipment 110 for performing agricultural activities such as transporting activities. The work equipment may be a work vehicle such as a tractor. The agricultural activities relate to material carried by the work equipment. The work equipment 110 is arranged to transport material of one or a plurality of material types.

The work equipment comprises a quantity detection element 130 arranged to detect a quantity related to the material carried by the work equipment. The quantity detection element may be comprise a weight determination element 130 arranged to determine a weight of the carried material. The quantity detection element may comprise a cycle counter element arranged to detect an activity cycle performed by the work vehicle and to count the number of detected activity cycles. For example, if the work equipment performs a bale handling activity, the weight of the bales may be known on beforehand. The accumulated weight of the material carried by the work equipment in the bale handling activity can then be determined based on the counted number of bale handling cycles and based on the weight of each bale handled in the bale handling activity. Therefore, counting the number of bales handled gives the accumulated material weight carried by the work equipment.

The agricultural monitoring system 100 comprises a memory 140 configured to store information related to the nutrient flow. The memory 140 is arranged to store a plurality of defined locations located within the agricultural site. Each location is associated to a geographical coordinate and/or geographical zone. Each location is arranged to accommodate material of at least one material type. The memory 140 is further arranged to for each location store information related to a current nutrient stock state related to said at least one material type. The memory may further be arranged to store information related to the weight of the material.

The agricultural monitoring system is arranged to monitor a nutrient flow from a source location to a target location within an agricultural site. The source location(s) is one or a plurality of the defined locations. The target location(s) is one or a plurality of the defined locations.

The work equipment 110 may comprise a position obtaining element 120 arranged to obtain the geographical position of the work equipment. The position obtaining element may be arranged to obtain the geographical position of the work vehicle in a global coordinate system. The position obtaining element may comprise a GPS receiver. The source location and/or target location may be obtained by means of the position obtaining element. This will be discussed more in detail later.

Alternatively, or in addition thereto, the source and/or target location may be obtain via user input. This will be discussed more in detail later.

When activities have been performed, which updates the nutrient flow status, the memory 140 is arranged to, upon reception of information related to the nutrient flow, for the respective source and target location, update the content thereof with the received information related to the nutrient flow. Thus, the information related to the current nutrient stock state related to said at least one material type for the respective location is updated.

In one example, in the memory 140 each source and/or target location is associated to a stock state history and/or nutrient content(s) associated to the respective stock state(s) in the stock state history.

When the agricultural monitoring system is arranged to monitor a nutrient flow from a source location to a target location using a plurality of activities, information related to locations associated to those activities may also be stored in the memory. For example, capture and release locations for at least some of the activities may be stored. In an example, the position obtaining element is arranged to obtain position information related to the location at capture and/or release of the material by means of the work equipment. In one example, in the memory 140 each capture and/or release location is associated to a stock state history and/or nutrient content(s) associated to the respective stock state(s) in the stock state history.

The memory 140 may be arranged at one of the work equipment or shared between a plurality of the pieces of work equipment. When the memory is shared between pluralities of the work equipment, in one example an updated copy of the memory contents is held by each of the plurality of work equipment. In another example, the memories of the plurality of work equipment hold different parts of the memory contents. In yet another example, the memory is at least partly accommodated at another location.

The agricultural monitoring system 100 comprises a user interface 150. The user interface 150 may comprise a graphical user interface for display of the monitored nutrient flow. The graphical user interface may be arranged to display the nutrient flow between at least one source location and at least one target location preferably within a given time interval. The graphical user interface may be arranged to display a current nutrient content at one or a plurality of source and/or target locations. The graphical user interface may be arranged to display activities performed in relation to a nutrient flow from at least one source location to at least one target location.

The user interface 150 may, as stated above, comprise a graphical user interface. The graphical user interface may comprise a display. The display may be a display with input means. The term "display with input means" is intended to include all both display with built-in input means and displays with input means connected thereto. Different examples of displays include displays with a touch screen or displays with or connected to a key board. The display may be a mobile device with a display such as a PDA (Personal Digital Assistant).

The user interface comprises in one example input means for input of the material type of the carried material. Thus, in accordance with this example is the user interface 150 arranged to receive user input information related to the material type of the carried material. The user interface is in one example arranged to present a plurality of pre-selectable material types.

In one example, at least one selectable material handling activity is associated to each material type. The user interface may then be arranged to receive user input related to at least one material handling activity related to the carried material. The user interface may be arranged to present a plurality of pre-selectable activities and/or activity chains. Each activity may be associated to one or a plurality of selectable material types.

In an example, the user interface is arranged to receive user input related to at least one material handling activity related to the carried material. The information related to the nutrient flow transmitted to the memory may then comprise an indication of said at least one activity.

Different ways of obtaining information related to work activities and/or material types will be discussed later herein.

Further, the user interface comprising user input means may be configured to obtain user input related to the source location and/or the target location for the carried material. The user interface may be arranged to display information related to the plurality of defined locations each associated with a geographical coordinate and/or geographical zone as available source and/or target selections. The respective location may be associated to a name and/or information related to whether the location is a target and/or source location. Further, the user interface may be arranged to support input to define new geographical location for selection as source and/or target.

If the work equipment has a position obtaining element, the position obtained by the position obtaining element may be used for obtaining a computer aided selection of defined locations. For example, the user interface may be arranged to present one or a plurality of source and/or locations obtained based on the position obtained by the position obtaining element and the user can then confirm the selection(s), select a subset of the presented suggested source and/or target locations, or select source and/or target location(s) other the computer selected, by means of the user interface.

The user interface may be arranged to receive user input related to an activity target related to the quantity and/or nutrient content. The user interface may be arranged to present information that the target has been reached. The user interface may be arranged at the work equipment or elsewhere.

The material types may comprise at least one of the following material types: straw bales, hay bales, haylage bales, silage bales, silage, rye, barley, wheat, oat, forage, manure and fertilizer. The activity or activities comprises in one example at least one of the following: bale handling, silage handling, grain handling, forage handling, manure handling, and fertilizer handling.

The agricultural monitoring system 100 comprises further a control element 160 configured to communicate with said user interface 150. The control element is arranged to receive from the quantity detection element, a quantity related to the material carried by the work equipment. The control element may is further be arranged to receive position information related to the location when capturing material by means of the work equipment. The control element 160 is further arranged to determine the nutrient content of the carried material based on the detected quantity and based on at least one nutrient content parameter value associated with the carried material. The control element is further arranged to transmit information to the memory related to the nutrient flow. The information related to the nutrient flow comprises the source location(s), the target location(s) and information related to the nutrient content and preferably material type of the carried material.

The control element may be arranged to receive information related to the source location and the target location for the carried material obtained via the user input means. The control element may be arranged to receive position information from the position obtaining element and to determine the source position and or the target position based on the obtained position information, as discussed above. Further, the control element may be arranged to receive position information from the position obtaining element related to the location at capture and/or release of the material by means of the work equipment. The capture and release events characteristically represent start and end of an activity. In a case where the activity involves that the same activity is repeated a plurality of times, the start of the activity may be represented by the first capture event in the activity and the end of the activity may be represented by the last release event in the activity.

In one example, the operation of the work equipment is monitored so as to detect an operational state of the work equipment. The operational state may be detected by monitoring the weight determined by the weight determining element. When it is determined that the weight is increasing, a first operational state may be detected wherein material is captured. When it is determined that the weight is decreasing, a second operational state may be detected wherein material is released. In the same manned a third, empty load state and/a fourth, loaded state may be detected. The control element is in one example arranged to detect the operational state of the work equipment. The control element may be arranged to detect the operational state of the work equipment at least based on information obtained from the weight determining element.

When in the first state, where material is captured is detected, the control element may be arranged to obtain position information from the position obtaining element and to record the position information as a capture location. If a source location for the nutrient flow has already been set, the control element may be arranged to compare the set coordinates for the source location with the capture location, and if the coordinates coincide, it is determined that the first state relates to the capture of material at the source location. When the second state where material is released is detected, the control element may be arranged to obtain position information from the position obtaining element. Likewise, if a target location for the nutrient flow has already been set, the control element may be arranged to compare the set coordinates for the target location with the release location, and if the coordinates coincide, it is determined that the second state relates to the release of material at the target location. Thus the nutrient flow between the source location and the target location has been finished. If the coordinates for the release location and target location do not coincide, the control element may assume that there is a next activity in the nutrient flow.

When the user interface is arranged to receive user input related to a material handling activity or chain of material handling activities related to the nutrient flow, the information related to the nutrient flow transmitted to the memory may comprise material an indication of said activity or activity chain. At least one of the activities may be associated with coordinate information.

The control element 160 is in an example arranged to process the determined nutrient content from a plurality of quantity detections to determine an aggregated nutrient content carried by the work equipment and to transmit the aggregated nutrient content information to the memory.

In the illustrated example, each piece of work equipment 110 has a work equipment communication interface 170 connectable to a communication network.

The memory contents and/or updates thereof may be communicated within the system by means of the work equipment communication interface 170.

The user interface is located at or integrated within one or a plurality of the work equipment and/or elsewhere in the system, such as a remote data storage and processing system and/or an electronic user device.

The control element is located at or integrated within one or a plurality of the work equipment and/or elsewhere in the system such as a remote data storage and processing system and/or an electronic user device.

The memory is located at or integrated within one or a plurality of the work equipment and/or elsewhere in the system, such as a remote data storage and processing system and/or an electronic user device.

Figure 2:
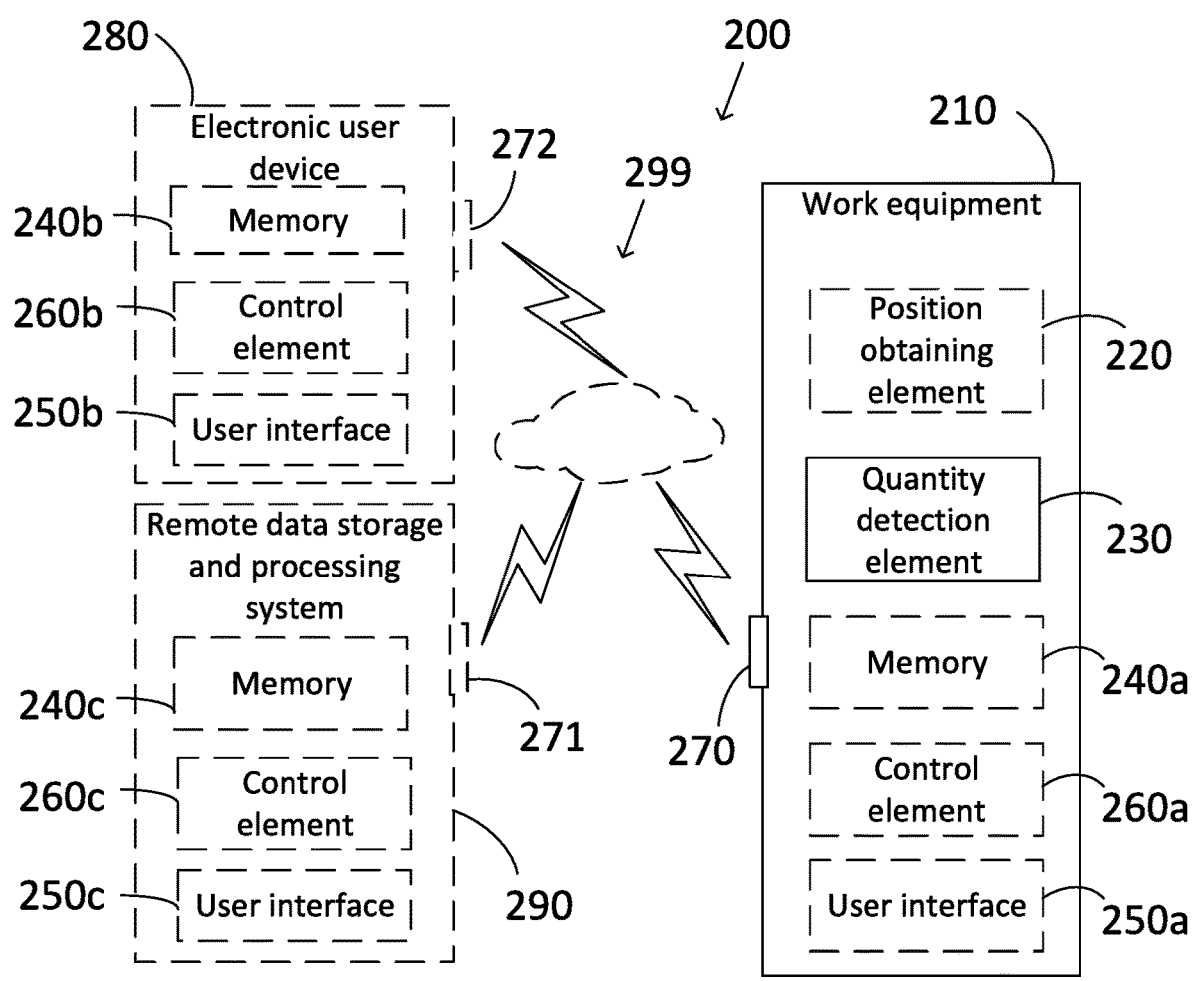
FIG. 2 is a block scheme illustrating different example of design of an agricultural monitoring system for monitoring a nutrient flow.

FIG. 2 illustrates an example of an agricultural monitoring system 200 for monitoring a nutrient flow within an agricultural site. The system comprises, as discussed in relation to FIG. 1 at least one work equipment 210 configured to perform at least one agricultural activity related to material carried by the work equipment. The work equipment 210 is arranged to carry material of one or a plurality of material types.

Each work equipment 210 may comprise a position obtaining element 220 arranged to obtain the geographical position of the work vehicle. The work equipment 210 comprises a quantity detection element 230 arranged to detect a quantity related to the material carried by the work equipment. The work equipment comprises further a work equipment communication interface 270 connectable to a communication network 299, or the like.

The work equipment may further comprise a memory 240$a$, and/or a control element 260$a$ and/or a user interface 250$a$. The work equipment 210 may have some or all of the features as disclosed in relation to the work equipment and/or memory and/or user interface and/or control element as discussed in relation to FIG. 1.

The agricultural monitoring system 200 may further comprise a remote data storage and processing system 290. The remote data storage and processing system comprises a remote data storage and processing system communication interface 271 connected to said communication network 299. The remote data storage and processing system 290 is arranged to at least partly accommodate a memory 240$c$ or a copy thereof comprising information related to monitoring of the nutrient flow. The remote storage and processing system memory 240$c$ may have all or some of the features as disclosed in relation to the memory in FIG. 1.

The remote data storage and processing system 290 may further be arranged to at least partly accommodate a control element 260$c$. The remote storage and processing system control element 260$c$ may have all or some of the features as disclosed in relation to the control element in FIG. 1.

The remote data storage and processing system 290 may further be arranged to at least partly accommodate a user interface 250$c$. The remote storage and processing system user interface 250$c$ may have all or some of the features as disclosed in relation to the control element in FIG. 1.

In one example, the pieces of work equipment 220 are arranged to transmit information related to the nutrient flow to the memory 240$c$ accommodated in the remote data storage and processing system 290. The information related to the nutrient flow comprises the source location, the target location and information related to the nutrient content of the carried material. Thereby the memory 240$c$ accommodated in the remote data storage and processing system 290 stores all data related to the nutrient content flow.

In the illustrated example, the agricultural monitoring system 200 further comprises an electronic user device 280. The electronic user device may be embodied by a mobile phone. The electronic user device 280 comprises an electronic user device communication interface 272 for communication with said at least one work equipment communication interface 270 and/or said remote data storage and processing system communication interface 271. The electronic user device may be embodied by a mobile phone providing data communication over the Internet via the mobile phone network. Thus, at least the user device communication interface may comprise a wireless mobile phone network interface. The communication interfaces may also comprise a mini-USB port, and/or another wireless interface, such as e.g. a blue tooth interface.

The electronic user device 280 comprises a user interface 250$b$. The electronic user device user interface 250$b$ may have all or some of the features as disclosed in relation to the control element in FIG. 1. Accordingly, the user interface 250$b$ may comprise a graphical user interface for display of the monitored nutrient flow. The graphical user interface may be arranged to display the nutrient flow between one or more source and target locations preferably within a given time interval. The graphical user interface may be arranged to display a current nutrient content at one or a plurality of source and/or target locations. The graphical user interface may be arranged to display activities performed in relation to a nutrient flow from at least one source location to at least one target location.

The user interface 250$b$ may be arranged to receive user input information related to the material type of the captured material. The user interface may be arranged to present a plurality of pre-selectable material types. The material types may comprise at least one of the following: straw bales, hay bales, haylage bales, silage bales, silage, rye, barley, wheat, oat, forage, manure and fertilizer.

One or a plurality of selectable material handling activities and/or activity chains may be associated to each material type. Each activity may be associated to one or a plurality of selectable material types. The user interface may then be arranged to receive user input related to a material handling activity or chain of material handling activities related to the material under transport. The user interface may be arranged to present a plurality of pre-selectable activities or activity chains. The activity or chain of activities may comprise one of bale handling, silage handling, grain handling, forage handling, manure handling, and fertilizer handling.

Further, the user interface may be configured to obtain user input related to the source location and/or the target location for the carried material. The user interface may be arranged to display information related to the plurality of defined locations each associated with a geographical coordinate and/or geographical zone as available source and/or target selections. The respective location may be associated to a name and/or information related to whether the location is a target and/or source location. Further, the user interface may be arranged to support input to define new geographical location for selection as source and/or target.

If the work equipment has a position obtaining element, the position obtained by the position obtaining element may be used for obtaining a computer aided selection of defined locations. For example, the user interface may be arranged to present one or a plurality of source and/or locations obtained based on the position obtained by the position obtaining element and the user can then confirm the selection(s), select a subset of the presented suggested source and/or target locations, or select source and/or target location(s) other the computer selected, by means of the user interface.

The user interface 250b may be arranged to receive user input for an activity target related to the quantity and/or nutrient content. The user interface may then be arranged to present information that the target has been reached.

The electronic user device 280 may further be arranged to at least partly accommodate a control element 260b. The electronic user device control element 260c may have all or some of the features as disclosed in relation to the control element in FIG. 1. For example, the control element may be arranged to determine when the activity target has been reached.

The electronic user device 280 may further be arranged to at least partly accommodate a memory 240c. The electronic user device memory 240c may have all or some of the features as disclosed in relation to the control element in FIG. 1.

Thus, control element function is provided by the work vehicle control element 260a and/or the remote data storage and processing control element 260c and/or the electronic user device control element 260b.

In detail, the work vehicle control element 260a and/or the remote data storage and processing control element 260c and/or the electronic user device control element 260b may comprise as data processor and program code for causing the data processor to perform digital signal processing. The data processor may be embodied by a Digital Signal Processor, DSP.

The work vehicle control element 260a and/or the remote data storage and processing control element 260c and/or the electronic user device control element 260b further comprise a program memory for storing program code. The program memory is preferably a non-volatile memory. The memory may be a read/write memory, i.e. enabling both reading data from the memory and writing new data onto the memory 2160. The program memory may be is embodied by a FLASH memory.

The program memory may comprise a first memory segment for storing a first set of program code which is executable so as to perform monitoring of the nutrient flow.

The program memory may also comprise a second memory segment for storing a second set of program code. The second set of program code in the second memory segment may include program code for causing the user interface to present and/or allow user input for monitoring the nutrient flow.

The program memory may also comprise a third memory segment for storing a third set of program code. The third set of program code in the second memory segment may include program code for provide a calendar function, a timer function, and/or a recording function.

Further, memory function is provided by the work vehicle memory 240a and/or the remote data storage and processing memory 240c and/or the electronic user device memory 240b.

The work vehicle memory 240a and/or the remote data storage and processing memory 240c and/or the electronic user device memory 240b is characteristically a read/write memory for data storage i.e. a memory enabling both reading data from the memory and writing new data onto the memory. The read/write memory may be a non-volatile memory. The read/write memory may be embodied by a FLASH memory.

Further, user interface function is provided by the work vehicle user interface 250a and/or the remote data storage and processing user interface 250c and/or the electronic user device user interface 250b.

The work vehicle communication interface 270, the remote data storage and processing system communication interface 271 and/or the electronic user device communication interface 272 may as discussed above be connectable to a communication network 299, such as the Internet. The communication interfaces may be adapted for communication via a radio interface such as e.g. blue tooth. The communication interfaces may further or instead comprise mutually connectable and mating connectors for Ohmic contact.

Figure 3:
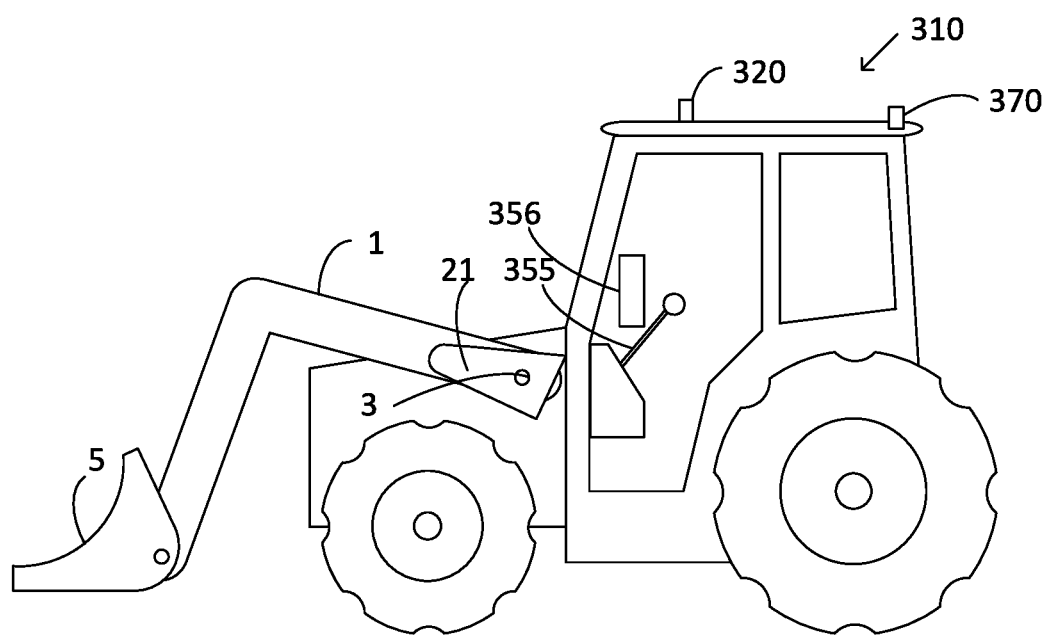
FIG. 3 illustrates schematically an example of a work equipment.

FIG. 3 illustrates an example of work equipment 310 configured to perform at least one agricultural activity related to material carried by work equipment. The work equipment is in the illustrated example in a work vehicle. The work vehicle is in the illustrated example a tractor. The tractor may have an implement 1 attachable to the tractor. The implement may comprise a loader. The loader may be a front loader.

In the illustrated example the tractor has a fastener 21 for releasable fastening of the implement 1. The implement 1 has an elongated arm. The arm has a fastening arrangement adapted for releasable fastening to said fastener 21.

Further, an attachment arrangement is connected to the other end of the arm. The attachment arrangement is adapted for releasable attachment of a work tool 5. In the illustrated example the work tool 5 is attached to the implement by means of the attachment arrangement.

In the illustrated example, the tractor is arranged to transport material of one or a plurality of material types for example dependent on the type of implement and/or tool attached to the tractor. The tractor may comprise a position obtaining element 320 arranged to obtain the geographical position of the tractor. The tractor comprises a quantity detection element (not shown) arranged to detect a quantity related to the material carried by the tractor. The quantity detection element may comprise a weight determination element arranged to determine a weight of the carried material. The tractor has further a control element (not shown). The quantity detection element may be partly implemented in the control element. The control element may be arranged to obtain from the position obtaining element, position information related to the source location and or target location and/or capture location and or release location, as discussed in relation to FIGS. 1 and 2.

The control element may further contain functionality of the quantity detection element. The control element may for example be arranged to determine a weight related to the weight of the captured material using the weight determining element.

The control element may be arranged to receive information related to the source location and the target location for the carried material obtained via the user input means. The control element may be arranged to receive position information from the position obtaining element and to determine the source position and or the target position based on the obtained position information, as discussed above. Further, the control element may be arranged to receive position information from the position obtaining element related to the location at capture and/or release of the material by means of the implement of the tractor. The capture and release event characteristically represent start and end of an activity.

In one example, the operation of the tractor is monitored so as to detect an operational state of the tractor. The operational state may be detected by monitoring the weight determined by the weight determining element. When it is determined that the weight is increasing, a first operational state may be detected wherein material is captured. When it is determined that the weight is decreasing, a second operational state may be detected wherein material is released. In the same manned a third, empty load state and/a fourth, loaded state may be detected. The control element is in one example arranged to detect the operational state of the work equipment. The control element may be arranged to detect the operational state of the work equipment at least based on information obtained from the weight determining element.

When the first state, where material is captured is detected, the control element may be arranged to obtain position information from the position obtaining element and to record the position information as a capture location. If a source location for the nutrient flow has already been set, the control element may be arranged to compare the set coordinates for the source location with the capture location, and if the coordinates coincide, it is determined that the first state relates to the capture of material at the source location. When the second state where material is released is detected, the control element may be arranged to obtain position information from the position obtaining element. Likewise, if a target location for the nutrient flow has already been set, the control element may be arranged to compare the set coordinates for the target location with the release location, and if the coordinates coincide, it is determined that the second state relates to the release of material at the target location. Thus the nutrient flow between the source location and the target location has been finished. If the coordinates for the release location and target location do not coincide, the control element may assume that there is a next activity in the nutrient flow.

The control element is further arranged to determine the nutrient content of the captured material based on the detected quantity and based on at least one nutrient content parameter value associated with the carried material. The control element is further arranged to control transmittal of information related to the nutrient flow to a memory. The information related to the nutrient flow comprises the source location, the target location and the information related to the determined nutrient content and preferably material type of the carried material.

The implement may comprise at least a part of the control element.

A user interface 356 may be arranged at the tractor. The user interface may be formed as discussed in relation to FIGS. 1 and 2. The user interface comprises in the illustrated example a display 356. The display may be a display with input means. The term "display with input means" is intended to include all both display with built-in input means and displays with input means connected thereto. Different examples of displays include displays with a touch screen or displays with or connected to a key board. The display may be a mobile device with a display such as a PDA (Personal Digital Assistant).

The operator interface comprises in the illustrated example an operator input element 355 such as a joystick. The joystick may be provided with buttons and/or a scroll wheel, etc.

Further, at least one communication interface 370 is arranged at the tractor or its implement. The communication interface may be formed as discussed in relation to FIGS. 1 and 2.

Further, the tractor and/or implement and/or work tool may comprise an equipment identity tag indicative of an equipment/implement/work tool ID code.

Figure 4:
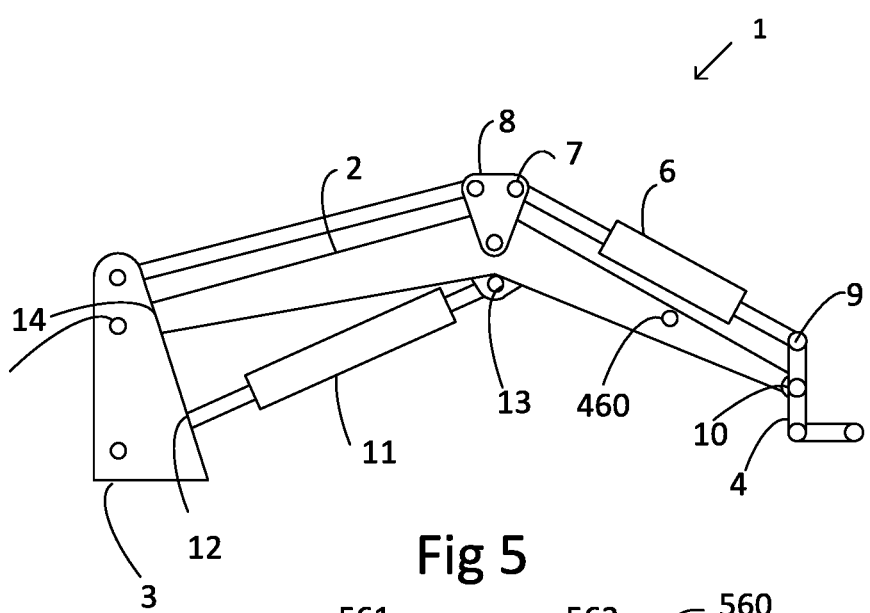
FIG. 4 illustrates schematically an example of an implement of a work equipment.

The implement 1 may have the features as discussed in relation to FIG. 4. The tractor is arranged to support hydraulics to the function of the implement when said implement is connected to the work vehicle and the hydraulic system is pressurized.

FIG. 4 discloses an implement 1 attachable to work equipment. The implement is configured to perform at least one agricultural activity related to material carried by the implement. The implement is arranged to transport material of one or a plurality of material types. The implement may comprise a position obtaining element arranged to obtain the geographical position. The implement comprises a quantity detection element arranged to detect a quantity related to the material carried by the implement. The quantity detection element may comprise a weight determination element arranged to determine a weight of the carried material. The implement comprises further a control element 460 arranged to receive from the quantity detection element a quantity related to the carried material, determine the nutrient content of the captured material based on the detected quantity and based on at least one predetermined nutrient content parameter value associated with the carried material, receive information related to a source location and an target location for the carried material, and transmit information related to the nutrient flow to a memory, said information comprising the source location, the target location and information related to the determined nutrient content and preferably material type of the carried material.

The implement, or loader, forms an elongated working tool carrier. The implement may be a front loader.

In the illustrated example, the implement comprises an arm 2. A fastening arrangement 3 is arranged at a first part of the arm. The fastening arrangement is connectable to the working vehicle. The fastening arrangement is in one example attached in relation to the arm 2 such that the arm can be moved in relation to the working vehicle. The arm can be made to make a pivoting movement in relation to the working vehicle around a pivot axis of the fastening arrangement.

The implement further comprises an attaching arrangement 4 connected to a second part of the arm 2. The attaching arrangement 4 is attachable to a working tool. The attaching arrangement 4 is in one example attached in relation to the arm 2 such that the attachment arrangement possibly with the working tool can be moved in relation to the arm 2. For example, the attaching arrangement 4 may be pivotally arranged in relation to the arm. Thereby the attaching arrangement 4 can be made to make a tilting movement in relation to the arm.

In the illustrated example, the arm 2 is an elongated arm. The arm is in the illustrated example rigid. The arm is on one example straight. The arm has in one example an elbow. The arm may comprise a plurality of elongated supporting arms connected to each other by transverse supports.

In the illustrated example, the implement comprises a first hydraulic cylinder arrangement 6. The first hydraulic cylinder arrangement 6 is when actuated arranged to cause the implement to carry out at least one first function. In the example, the at least one first function comprises a control of the attachment arrangement, and consequently a working tool attached thereto, in relation to the arm 2. Thus, movement of the attaching arrangement, and the working tool, when attached, can be controlled by the first hydraulic cylinder arrangement 6. The attachment arrangement 4 and the working tool 5 can be controlled to perform a tilting movement. In the illustrated example, the first hydraulic cylinder arrangement 6 is at its first end 7 attached to the arm. The first hydraulic cylinder arrangement 6 is for example mounted to the arm 2 at the middle of the arm. The first hydraulic cylinder arrangement 6 is in the illustrated example at its first end 7 mounted at an elbow of the arm. In the illustrated example, the first hydraulic cylinder arrangement 6 is at its first end 7 mounted to a support 8 mounted at the arm. In one example, the first cylinder arrangement 6 comprises a pair of first hydraulic cylinders. In one example the first cylinder arrangement comprises one first hydraulic cylinder. When the arm comprises a plurality of elongated supporting arms connected to each other by transverse supports, one or a plurality of first cylinders can be mounted to each of the supporting arms.

Further, in the illustrated example, the first hydraulic cylinder arrangement 6 is at its second end 9 attached to the attaching arrangement 4 for attachment to the working tool. In one example, the first hydraulic cylinder arrangement 6 extends in parallel with the arm 2. Thus there is a radial distance between a point of (pivoting) attachment 10 of the attachment arrangement to the arm 2 and the point of attachment 9 of the first hydraulic cylinder arrangement 6 to the attachment arrangement 4. Thereby the attachment arrangement 4, and working tool when attached, performs a pivoting movement in relation to the arm 2 as the piston(s) of the hydraulic cylinder arrangement 6 is extracted/retracted. In one example, the point of attachment of the second end 9 of the first hydraulic cylinder arrangement is straight above the point of attachment 10 of the attachment arrangement 4 at the arm 2. In one example, the attachment is such that the attachment arrangement 4 can perform a rotating movement in relation to the arm 2.

In the illustrated example, the implement 1 comprises further a second hydraulic cylinder arrangement 11. The second hydraulic cylinder arrangement 11 is when actuated arranged to cause the implement 1 to carry out a second function. In the illustrated example, the at least one second function comprises movement of the arm 2 in relation to the working vehicle, when the implement 1 is attached to the working vehicle. The arm 2 may be moved in a generally vertical direction in relation to the working vehicle. Movement of the arm 2 can be controlled by said second hydraulic cylinder arrangement 11. The arm 2 can be controlled to perform a pivoting movement. In the illustrated example, the second hydraulic cylinder arrangement 11 is at its first end 12 attached to the fastening arrangement 3. Further, in the illustrated example, the second hydraulic cylinder arrangement 11 is at its second end 13 attached to the arm 2. The first end 12 is attached to the fastening arrangement 3 at a radial distance from an attachment point 14 of the arm. Thereby, the arm 2 of the implement is caused to perform a movement upon action/retraction of the piston(s) in the second hydraulic cylinder arrangement 11. In one example, the first end 12 is attached to the fastening arrangement 3 vertically in relation to the attachment 14 of the arm to the fastening arrangement 3. In accordance with this example, the arm 2 of the implement 1 is caused to perform a lifting/lowering movement upon extraction/retraction of the piston(s) of the second hydraulic cylinder arrangement 11. In one example, the second cylinder arrangement 11 comprises a pair of second hydraulic cylinders. In one example the second cylinder arrangement comprises one second hydraulic cylinder. When the arm comprises a plurality of elongated supporting arms connected to each other by transverse supports, one or a plurality of second cylinders can be mounted to each of the supporting arms.

The first and/or second hydraulic cylinder arrangements 6, 11 are connected to a respective hydraulic circuit on the working vehicle, when the implement is attached to the working vehicle. The respective hydraulic circuit carries fluid to the corresponding at least one cylinder based on control from a hydraulic control valve at the working vehicle.

Different work tools can be attached to the attachment arrangement 4 of the implement, such as a bucket, bale handling implement bale grab, silage cutter, silage fork, hay fork etc.

An example of a working tool attachable to the implement is a standard bucket for transporting bulk material. The first cylinder arrangement 6 may be arranged to pivot the bucket. The second hydraulic cylinder arrangement 11 may be arranged to raise and lower the arm and consequently the bucket attached thereto.

The control element 460 is in the illustrated mounted at the arm 2. However, it can be mounted anywhere at the implement 1 and it can be at least partly arranged elsewhere, for example at work equipment carrying the implement and/or a work tool mounted to the implement.

As discussed above, the implement has a first hydraulic cylinder which, when actuated, is adapted to cause the relation to the tractor, when the implement 1 is attached to the tractor. The implement further has at least a first sensor (not shown) adapted to generate a first signal indicative of a hydraulic pressure in said first hydraulic cylinder when said first hydraulic cylinder is actuated. The control element 460 may be arranged to determine the weight based on a known relation between the load weight and the hydraulic pressure and based on the signal obtained by the first sensor.

The control element may be arranged to monitor the first signal generated by the first sensor to detect an operational state of the implement. Thus, the operational state is in the illustrated example detected by monitoring at least a hydraulic pressure in the first cylinder. When it is detected that the hydraulic pressure is increasing in a predetermined manner, a first operational state is detected, wherein material is captured. When it is determined that the hydraulic pressure is decreasing in a predetermined manner, a second operational state is detected, wherein material is released. The operational state information may be used in monitoring the nutrient flow to determine when material is captured and/or released.

Figure 5:
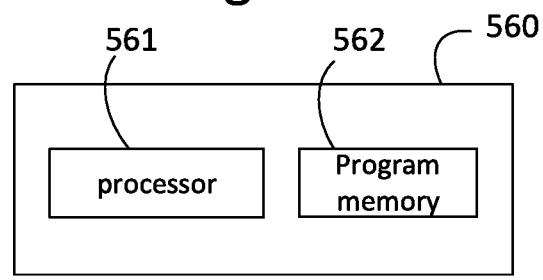
FIG. 5 is a block scheme schematically illustrating an example of a control element.

FIG. 5 illustrates a control element 560 comprising a processor 561 and a program memory 562. The control element 560 is arranged to receive from a quantity detection element a quantity related to a carried material, determine a nutrient content of the captured material based on the detected quantity and based on at least one predetermined nutrient content parameter value associated to the carried material, receive information related to a source location and a target location from the carried material, and form information related to the nutrient flow, said information comprising the source location, the target location and information related to the determined nutrient content and preferably material type of the carried material.

In FIG. 6, an example of memory recordings made in a memory of an agricultural monitoring system for monitoring a nutrient flow. The memory may be arranged to store recordings when a cycle comprising a source location and a target location have been detected. The recording comprises the source location and the target location. The source and/or the target location may be geographical coordinates and/or geographical zones. If for example release of material is made during movement of the work equipment, the geographical zone may be associated to a release distribution scheme indicating how the released material has been distributed within the target location zone. If for example the capture of material is made during movement of the work equipment, the geographical zone may be associated to a capture distribution scheme indicating how the captured material has been distributed within the source zone.

If a calendar and/or clock function is provided, a date and/or timing of the recording, i.e. timing of capture and/or release material at the respective source and/or target location may also be recorded (not shown).

Further, each recording in the memory also comprises information related to a material type of the material moved from the source location to the target location. The material type information may be obtained based on sensor data obtained from one or a plurality of sensors arranged at or in the vicinity of the captured material. At least one of the sensors is in one example arranged at work equipment handling the material. Instead or in addition thereto, the material type can be obtained based on manual user input. For example, a user interface may be arranged to present selectable material type alternatives. In one example, the user interface is arranged to present selectable material handling activities. Upon selection of a material handling activity, the user interface will present one or a plurality of selectable material type alternatives associated to that material handling activity.

The recording may also comprise the material handling activity or chain of material handling activities associated with the nutrient flow from the source location to the target location.

Further, each recording of the memory also comprises information related to a nutrient content. In order to determine the nutrient content of the moved material, a nutrient content scheme is used. The parameters of a certain material type are set. For example, the main nutrient content parameters for straw, hay, haylage, silage and grain are substantially the same. The main nutrient content parameters comprise characteristically percentage of dry material, crude protein, acid detergent fiber, neutral detergent fiber, crude fat, ash and starch. However, the parameter values (i.e. percentage values) may depend on prevailing conditions. The parameter values should therefore preferably be selected for that particular material handled. Accordingly, the user preferably when starting a material handling activity input the parameter values for the material to be handled by means of the user interface. The parameter values may be obtained from for example tests made on the material. Alternatively, or in addition thereto the parameter values may be obtained from at least one sensor arranged to sense some of the nutrient content or information thereto. Alternatively the parameter values are preset values specific for the material type and possibly for the source location. The nutrient content is determined based on at least one nutrient content parameter value related to at least one selected parameter of the nutrient content scheme and based on the detected quantity of the carried material.

In different applications, it may be desired to follow the nutrient flow of a subset of the parameters. For example, it may be desired to follow the flow of only crude protein and/or dry material and/or even water or liquid of any type. Then, the recordings may only relate to this subset of parameters.

Further, each recording may also comprise information related to a stock state of the material type of the recording, for the source and/or target location. The stock state may related to the nutrient content. The nutrient content stock state may be given in weigh, such as kilogram. The stock state may instead, or in addition thereto, relate to the weight of the material.

The activity recording may further be indicative of the identity(-ies) of the implement(s) and/or (pieces of) work equipment and/or work tool(s) which have performed the activity(ies) related to the recording.

In FIG. 7, a scheme is illustrated for associating material handling activities to material types and for associating material types to nutrient content schemes.

In the illustrated example, a bale handling activity (left column) is associated to material types (middle column). The exemplified material types comprise straw bales, hay bales, haylage bales and silage bales. Further, a silage handling activity is associated to the exemplified material type silage. Further, a grain handling activity is associated to the following material type examples: rye, barley, wheat and oat. Further, a forage handling activity is associated to material type example forage. A manure handling activity is associated to the material type example manure. A fertilizer handling activity is associated to the material type example fertilizer.

Further, nutrient content parameters are associated to the respective material types (right column). The main nutrient content parameters for straw, hay, haylage, silage, grain and forage are substantially the same. Therefore, the same main nutrient content parameters for those material types have been illustrated. The main nutrient content parameters comprise in the illustrated example percentage dry material, crude protein, acid detergent fiber, neutral detergent fiber, crude fat, ash and starch. However, the nutrient content parameter values (i.e. percentage values) depend on material type and prevailing conditions. In the same manner, the main nutrient content parameters for manure and fertilizers are substantially the same. The main nutrient content parameters comprise characteristically dry matter, nitrogen, phosphorous and potassium, as has been illustrated in right column of FIG. 7. However, the parameter values (i.e. percentage values) depend on material type and prevailing conditions.

The nutrient content parameters given above are only examples. The term "nutrient content" is intended to be broadly interpreted and may even include parameters such as water.

In practice, when starting a material handling activity, the exemplified material handling activities in left column in FIG. 7 may be pre-selectable. Upon selection of a material handling activity, the material types associated to that selection may be presented at the user interface. Upon selection of a material type, the nutrient content scheme may be presented and the parameter values can be set by the user and/or based on pre-set and/or sensor information.

The selection of activity(-ies) and/or material type(s) and/or nutrient content parameter(s) and/or nutrient content parameter value(s) may be made by manual user input, by use of obtained sensor data and possible processing thereof or intelligence based on collected data, or a combination thereof. This will be discussed more in detail later.

In FIG. 8, an example of a scheme is illustrated for selecting a specific material handling activity or a chain of material handling activities. For example the bale handling activity may comprise one, some or all of the bale handling selections associated to the bale handling activity. Thus, the user may select which bale handling activities are carried out between the source and the target location.

In the illustrated example, the bale handling activity comprises the activity selections bailing, bale handling/loading, bale transport, bale splitting. A silage handling activity comprises the activity selections silage pit preparation, silage withdrawal, silage handling/loading, silage transport. A grain handling activity comprises the activity selections grain harvesting, grain transport and grain handling/loading. A forage handling activity comprises the activity selections forage mixing and feeding. A manure handling activity comprises the activity selections manure handling/loading, manure transport and manure spreading. A fertilized handling activity comprises the fertilizer handling selections fertilizer handling loading, fertilizer transport and fertilizer spreading.

In FIGS. 9a-9d, different examples of activity flows for material transport from a source to a target are illustrated. The source is associated to a geographical coordinate or geographical zone, i.e. a source location. The target is also related to a geographical coordinate or zone, i.e. a target location.

The source location in each activity flow may be arranged to accommodate material of one type or of more than one type. Further, the target location in each activity flow may be arranged to accommodate material of one type or of more than one type.

The activity flow may involve flow of material from one or a plurality of source locations to one or a plurality of target locations. The activity flow may also involve a plurality of activity types, such as silage handling and forage handling.

The entire activity flow can be monitored in systems as disclosed in this disclosure. This is illustrated in the examples discussed in relation to FIGS. 9a-9d.

Before starting the work activities using one or a plurality work equipment/implement(s)/work tool(s), a work activity flow may be initiated by a nutrient content monitoring system. Initiation of the work activity flow may involve setting one or a plurality of first work activities in the work activity flow. When starting a first work activity, available system information related to used work equipment, implement and/or work tool attached thereto may be used for determining or narrowing down a selection of possible first work activities and/or material types. For example, if a baler is attached to an implement, the first work activity is characteristically bailing and the material type is most likely one of a straw bale, a hay bale, a haylage bale or a silage bale. Other information may be used for at least narrowing down the number of possible first work activity selections and/or possible material types. For example, the weight of a captured material may be an indication about the activity performed and/or the material type. Hay bales have usually one characteristic weight while ensilage bales or buckets of manure have other weights. Other available system information may be information related to which work activities and/or material types are most likely to occur at a specific location. The present location may be obtained by a position obtaining element, such as a GPS receiver or the like. Thus position information may be may be used for narrowing down a selection of possible first work activities and/or material types. Different types of sensor information may also be used for determining or at least narrowing down a selection of possible first work activities and/or material types.

Thus, in one example, the user selects the first work activity preferably based on a pre-selection obtained by the system, wherein the available pre-selections may be narrowed down by the system. Alternatively, the system selects and presents the first work activity and the user choose to confirm the system selection. If the system selection is not confirmed, the user may select the first work activity. In yet another example, the system is completely automated.

Likewise, the user may select the material type to be moved preferably based on a pre-selection obtained by the system, wherein available pre-selections may have been narrowed down by the system, or the system presents a system-selected material type, which selection the user can choose to confirm or not, or the system is completely automated in determining the material type.

Further, the user may select the nutrient content to be monitored. For example, the nutrient content may be monitored for all of the substances available for a material type or a small selection comprising at least one substance. Alternatively there is a system-set preselection of substance to be monitored.

Further, a parameter value of the substance(s) of the material is obtained. The work equipment may have sensor(s) arranged obtain the parameter value(s). The system may have one or a plurality of pre-stored parameter value(s) related to the substance(s) of the respective material types. The pre-stored parameter value(s) may be associated to conditions relevant for the parameter value(s). The condition may for example include the geographical location where the material was grown or the farm or farm location, from where the manure comes. The parameter value(s) may be obtained by used input.

Once the first work activity of the activity flow has been set, subsequent work activities in the activity flow may be set. This may for example be made by user input via a user interface in the system. Thus, the work activities in the work activity flow may be set at initialization. Alternatively, when each work activity is finalized, the system detects and/or a user selects a next work activity(-ies) in the activity flow or alternatively that the activity flow has ended.

Figure 9A:
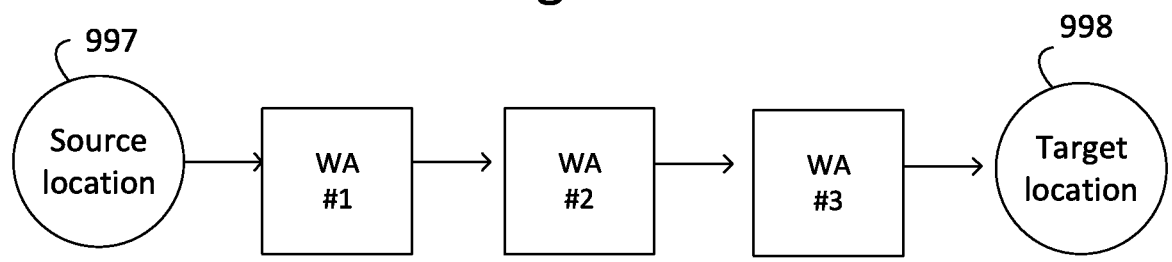
FIGS. 9a-9d are illustrating examples of nutrient flow at a site.

In FIG. 9a, a work activity flow is illustrated where the work activities are performed serially. The source location is determined by means of the position obtaining element and the first work activity WA #1 is performed. After the first work activity WA #1 has been finalized, it is determined whether the work flow has been ended and the target location has been reached or whether anther work activity will take place. If the chain of activities has been pre-set, this is inherent from the preset chain of activities. Otherwise, the next activity can be detected for example as discussed in relation to detection of the first work activity. If the end of the chain of work activities has not been reached, a second work activity WA #2 is performed. A hand over from the first work activity WA #1 to the second work activity WA #2 may comprise transferring information related to the source location. The hand-over may also comprise transferring information related to material weight handled by the first work activity WA #1, wherein in the material weight may be an accumulated material weight, and/or a nutrient content (weight) handled by the first work activity WA #1, wherein the nutrient content (weight) may be an accumulated weight. Further, a position for the hand-over may be recorded and transferred to the second work activity WA #2. In one example, if the first and the second work activities are performed by different pieces of work equipment, position information obtained by the pieces of work equipment involved in the hand over may be monitored to confirm that a hand over has taken place. Further, information related to an identity, ID, of a work equipment/implement/work tool used in the first work activity may be handed over to the second work activity WA #2.

After hand-over of activity flow data, the second work activity WA #2 is performed. After the second work activity WA #2 has been finalized, it is determined whether the work flow has been ended and the target location has been reached or whether another work activity will take place. If the chain of activities has been pre-set, this is inherent from the preset chain of activities. Otherwise, the next activity can be detected for example as discussed in relation to detection of the first work activity. If the end of the chain of work activities has not been reached, has been reached, a next work activity WA #3 is performed. A hand-over from the second work activity WA #2 to the next work activity WA #3 may comprise transferring information related to the source location, material weight handled by the first work activity WA #1 and possible by the second work activity WA #2, if available, wherein in the material weight may be an accumulated material weight, and a nutrient content (weight) handled by the first work activity WA #1 and possibly by the second work activity WA #2, if available, wherein the nutrient content (weight) may be an accumulated weight. Further, a position for the hand-over may be recorded and transferred to the next work activity WA #3.

After the next work activity WA #3 has been finalized, it is determined whether the activity flow has been ended and the target location has been reached or whether another work activity will take place. If the chain of activities has been pre-set, this is inherent from the preset chain of activities. Otherwise, the next activity can be detected for example as discussed in relation to detection of the first work activity. If it is determined that the activity flow has been ended, position information is obtained and recorded as a target location. The workflow activity is recorded in a memory. Examples of such records are for example discussed in relation to FIG. 6.

The handover information related to handover between the different work activities may also at least temporarily be stored in the memory of the system. The hand-over information is preferably associated to the workflow activity record.

Figure 9B:
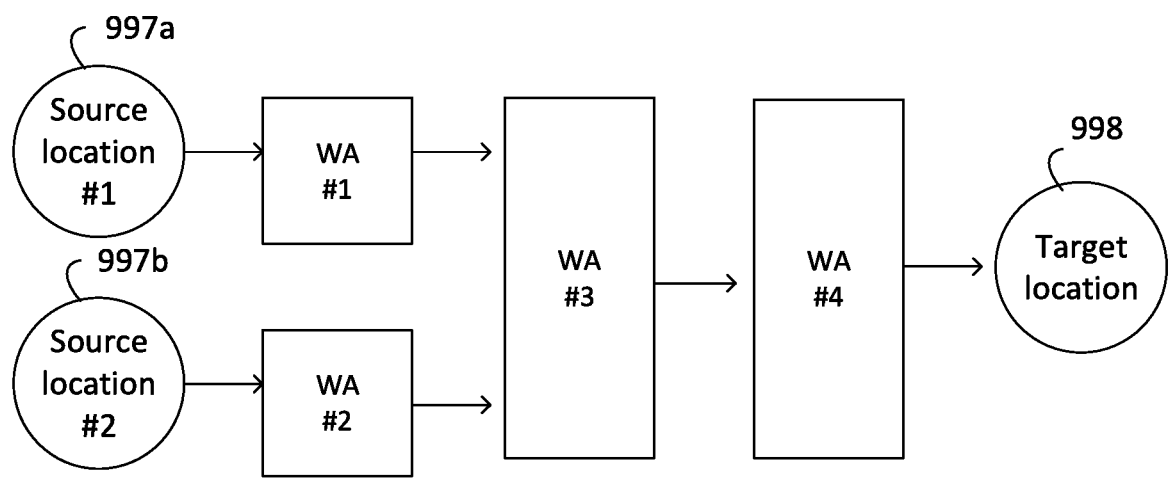

In FIG. 9b, a work activity flow is illustrated where at least some of the work activities are performed in parallel. As discussed above, before starting the work activities using one or a plurality work equipment/implement(s)/work tool(s), the work activity flow may be initiated by the nutrient content monitoring system. In this example, initiation of the work activity flow involves setting two first work activities in the work activity flow, as discussed above. Further, a material type is determined for the respective source, as discussed above. Nutrient content parameters to be monitored may be selected, as discussed above. Further, nutrient content parameter values for the respective material type are determined, as discussed above.

The first and second source locations are determined. The source location position may be determined by means of a respective position obtaining element. The first and second work activities WA #1, WA #2 are performed in parallel.

After the first and second work activities WA #1, WA #2 have been finalized, it is determined whether the work flow has been ended and the target location has been reached or whether anther work activity will take place. If the chain of activities has been pre-set, this is inherent from the preset chain of activities. Otherwise, the next activity can be detected for example as discussed in relation to detection of the first work activity. If the end of the chain of work activities has not been reached, a third work activity WA #3 is performed. In this illustrated case, the third work activity WA #3 made as a result of both the first and second work activities WA #1 and WA #2. Thus, hand over is made both from the first and second work activities WA #1, WA #2 to the third work activity WA #3. The hand-over then involves may involve transferring information related to the first and second source locations. The hand-over comprises transferring information related to material weight handled by the first and second work activities WA #1, WA #2, wherein in the material weight may be an accumulated material weight, and/or transferring information related to a nutrient content (weight) handled by the first and second work activities WA #1, WA #2, wherein the nutrient content (weight) may be an accumulated weight. Further, a position for the hand-over may be recorded and transferred to the third work activity WA #3.

The first and second work activities may be the same or different work activities. For example, bales may be collected from different source locations. Further, the first and second work activities may relate to the same or different material types. For example, both hay bales and straw bales may be collected. The collected bales may then be transported in a transport work activity. In an alternative example, different material types are transported to a mixer where a mixing work activity takes place.

The nutrient content and/or the material weight resulting from the third activity is a blending activity such as a mixing work activity be recorded as a sum weight and/or sum nutrient content.

After hand-over of activity flow data, the third work activity WA #3 is performed. In the illustrated work activity thereafter a fourth work activity WA #4 distributes the material to the target location.

Figure 9C:
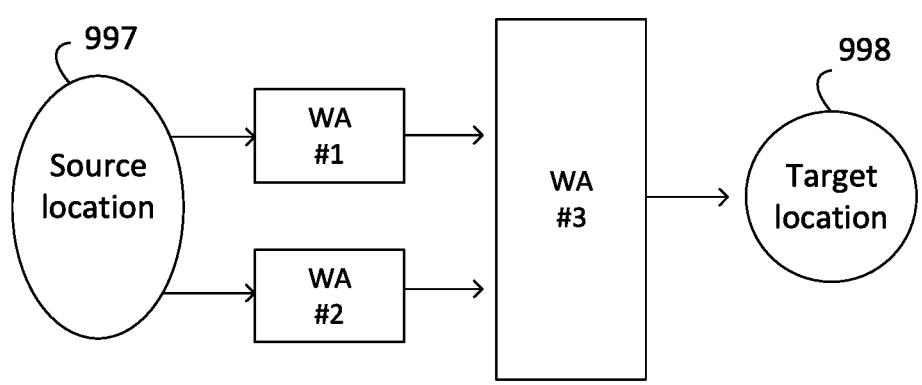

In FIG. 9c, a work activity flow similar to that illustrated in FIG. 9b is illustrated. The difference is that the first and the second material types are provided from a common source location. Thus, this example is applicable in situations wherein a plurality of material types is stocked at the same location.

Figure 9D:
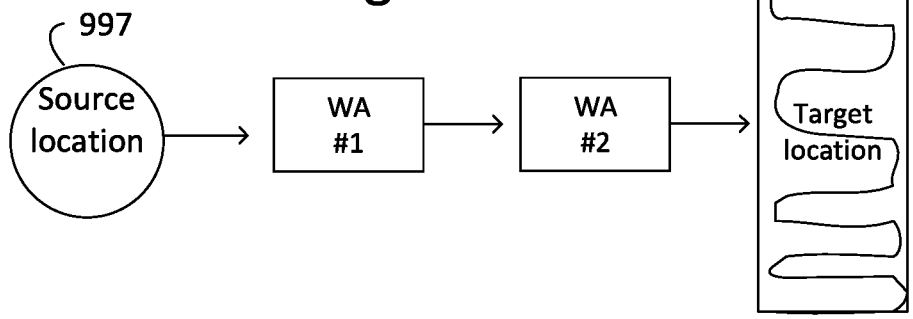

In FIG. 9d, a work activity flow is illustrated where the target location is a target zone rather than a coordinate. The target zone may for example represent the geographical extension of an agricultural field. The work activity releasing the material at the target zone may for example be manure or fertilizer spreading. When the release of material is made during movement of the work equipment, the geographical zone may be associated to a release distribution scheme indicating how the released material has been distributed within the zone.

In a not disclosed example, the source location is a source zone rather than a coordinate. The source zone may also here for example represent the geographical extension of an agricultural field. When for example the capture of material is made during movement of the work equipment, the geographical zone may be associated to a capture distribution scheme indicating how the captured material has been distributed within the capture, or source zone.

In FIG. 10, an example of a method 10 for initializing a work activity flow is illustrated. The steps are illustrated in series. Hoverer, at least some of the steps may be made in parallel. The steps may also be carried out in another order that the order illustrated in the example of FIG. 10.

In the illustrated example, a first activity in a work activity flow is set S11.

The method further comprises a step of determining S12 material type.

The method may comprise a step of determining S13 nutrient content scheme parameters to be monitored. The nutrient content scheme parameters may be selected from a nutrient content scheme associated to the material type.

The method comprises further a step of determining S14 nutrient content parameter values associated to the monitored nutrient content parameters.

The method may further comprise a step of pre-setting S15 an activity flow chain.

When the work activity flow has been initialized, the activity flow can be started S16.

In FIG. 11, an example of a method 20 for monitoring a nutrient flow within an agricultural site is illustrated. The steps are illustrated in series. However, at least some of the steps may be made in parallel. The steps may also be carried out in another order that the order illustrated in the example of FIG. 11.

In the illustrated example, the method for monitoring a nutrient flow within an agricultural site, said method comprises the steps of: detecting S21 a quantity related to a carried material of a known material type and determine S22 the nutrient content of the captured material based on the detected quantity and based on at least one predetermined nutrient content parameter value associated with the carried material. Parameter values for use may be obtained for example as discussed in relation to FIG. 10.

The method further comprises a step of obtaining S23 information related to a source location for the nutrient flow. In different examples, the information related to the source location is obtained before determining the nutrient content. Then, the information related to the source location may be used in determining a material type and/or nutrient content parameter values related to the carried material for use in determining the nutrient content.

The method further comprises a step of obtaining S24 information related to a target location for the nutrient flow.

The method further comprises a step of forming S25 information related to the nutrient flow, said information comprising the source location, the target location, and information related to the nutrient content and preferably material type of the carried material. The step of forming S25 information related to the nutrient flow comprises comprising the detected quantity in the information.

The method may further comprise a step of transmitting S26 the formed information related to the nutrient flow to a memory arranged to store a plurality of defined locations located within the agricultural site. Each defined location is associated with a geographical coordinate and/or geographical zone. The memory is arranged to, for each location, store information related to a current nutrient stock state related to said at least one material type.

The method may further comprise a step of, upon reception of information related to the nutrient flow, for the respective source and target location, update S27 the memory content with the received information related to the nutrient flow.

The source location may be one or a plurality of the defined locations and said target location being one or a plurality of the defined locations.

FIG. 12 illustrates an example of a method 30 for monitoring activities in a nutrient flow from a source location to a target location. At least some of the steps may be made in another order than the order illustrated in FIG. 12.

The method comprises the steps of, after the work activity flow has been initialized, at least position information representing a source location is obtained S31. Position information related to a target location may also be obtained S31. Further a quantity related to carried material is detected S32. Further, a nutrient content may be determined S33 based on the detected quantity and based on at least one predetermined nutrient content parameter value associated with the carried material.

Then it is monitored S34 whether a first work activity has been finished.

For example in an example, wherein the activity involves that the same activity is repeated a plurality of times, steps of detecting S32 a quantity and determining S33 a nutrient content may be performed after it has been determined that the work activity has been finished.

When the first work activity has been finished and there are no further work activities to be carried out, position information representing a target location is obtained S35, if not obtained before. Further, a nutrient content flow record from the source location to the target location is formed S36.

When there are additional work activities to be carried out, information related to the first work activity may at least temporarily be recorded S37 and/or handed over S38 to the next work activity. Thereafter the next work activity is monitored S34 to detect when it has been finished. When the next work activity has been finished and there are no further work activities to be carried out, position information representing a target location is obtained S35, if not obtained before. Further, a nutrient content flow record from the source location to the target location is formed S36, as discussed above. If there are additional work activities, the process is repeated.

It should be understood that when it is stated herein that a nutrient content is determined, it is not intended to mean that the nutrient content need to be determined in direct connection to the performance of the material handling activities. The information necessary for determining the nutrient content may form part of the stored records and the nutrient content values being calculated at any time, when it is desired to present or in any other way use such information.

Figure 13:
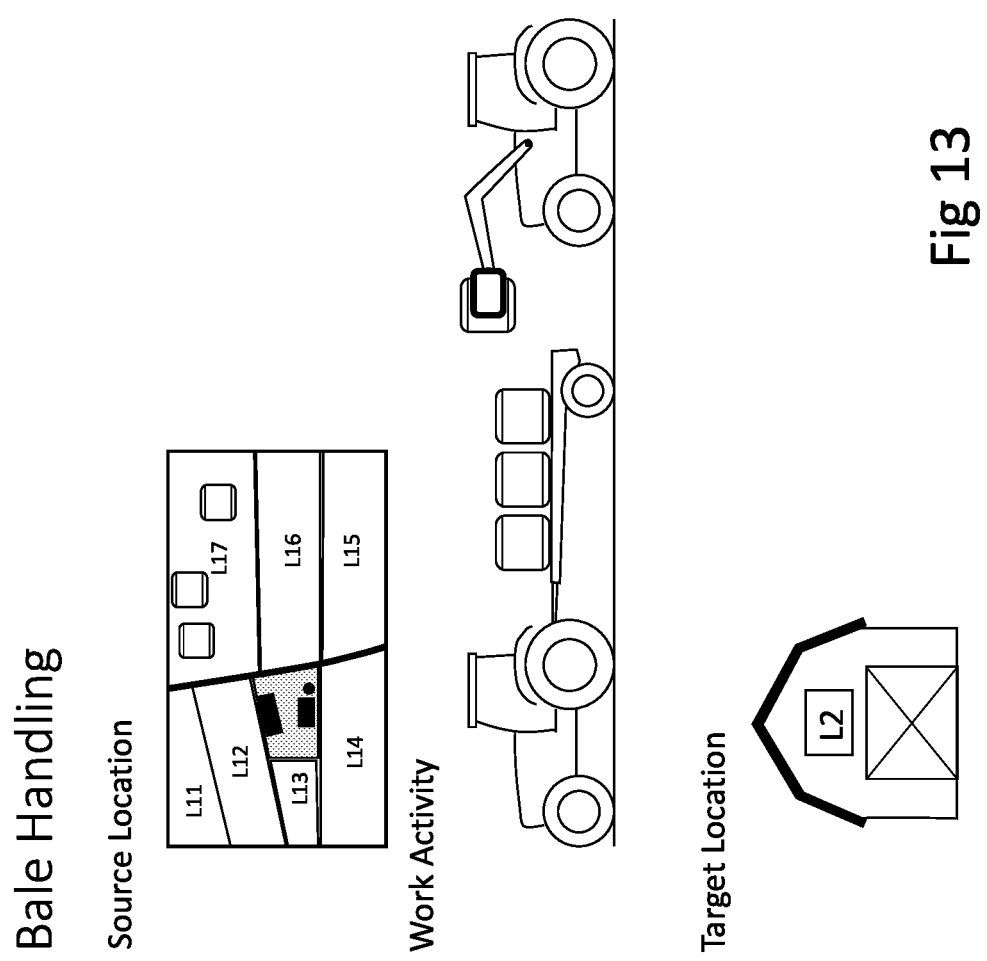
FIG. 13 illustrates an example of a nutrient flow related to a bale handling application.

FIG. 13 illustrates an example of a nutrient flow related to a bale handling application.

FIG. 14 illustrates an example of a nutrient flow related to a manure handling application.

FIG. 15 illustrates an example of a nutrient flow related to a silage take-out application.

I claim:

1. An agricultural monitoring system, said system comprising:
    at least one work equipment configured to perform at least one agricultural activity related to material carried by the at least one work equipment, wherein the material is of one or a plurality of material types, and wherein each work equipment comprises a weight detection element arranged to detect a weight related to the material carried by the work equipment;
    a memory arranged to store a plurality of defined locations located within an agricultural site, wherein each defined location is associated with a geographical coordinate, a geographical zone, or both, and wherein each defined location is arranged to accommodate material of at least one material type;
    a user interface; and
    a control element configured to communicate with said user interface, wherein the agricultural monitoring system is arranged to monitor a nutrient flow within the agricultural site, wherein the memory is configured to store information related to the nutrient flow and further is arranged to for each defined location store information related to a current nutrient stock state related to said at least one material type, and wherein the control element is arranged to
    receive from the weight detection element a weight related to the material carried by the work equipment,
    determine the nutrient content of the carried material based on the detected weight and based on at least one nutrient content parameter value associated with the carried material,
    receive information related to a source location and a target location for the carried material, said source location being one or a plurality of the defined locations and said target location being one or a plurality of the defined locations, and
    transmit information to the memory related to the nutrient flow, said information comprising the source location, the target location, information related to the determined nutrient content of the carried material and preferably material type of the carried material,
    wherein the carried material is associated with a nutrient content parameter comprising at least one of the following: crude protein, acid detergent fiber, neutral detergent fiber, crude fat, ash, starch, nitrogen, phosphorus or potassium, and
    wherein the at least one nutrient content parameter value is selected based on user input, obtained sensor data and possible processing thereof or intelligence based on collected data, or a combination thereof.

2. The agricultural monitoring system according to claim 1 wherein the carried material is associated with a nutrient content parameter comprising at least one of the following: crude protein, acid detergent fiber, neutral detergent fiber, crude fat, ash, and starch when the carried material is straw, hay, haylage, silage, grain or forage, or
nitrogen, phosphorus or potassium when the carried material is manure or fertilizer.

3. The agricultural monitoring system according to claim 1,
    wherein the weight detection element comprises a weight determination element arranged to determine the weight of the material,
    wherein the control element is arranged to process the determined nutrient content from a plurality of weight detections to determine an aggregated nutrient content carried by the work equipment and to transmit aggregated nutrient content information to the memory,
    or both.

4. The agricultural monitoring system according to claim 1, wherein the user interface comprises user input means and wherein the control element is arranged to receive information related to the source location and the target location for the carried material obtained via the user input means.

5. The agricultural monitoring system according to claim 1,
    wherein the work equipment comprises a position obtaining element arranged to obtain the geographical position of the work equipment,
    wherein the control element is arranged to receive position information from the position obtaining element and to determine the source position, the target position, or both, based on the obtained position information,
    wherein the control element is arranged to receive position information from the position obtaining element related to the location at capture, release of the material by means of the work equipment, or both,
    or both.

6. The agricultural monitoring system according to claim 1, wherein the memory is arranged to, upon reception of information related to the nutrient flow, for the respective source and target location, update the content thereof with the received information related to the nutrient flow.

7. The agricultural monitoring system according to claim 1, wherein the at least one material type comprises at least one of the following: straw, hay, haylage, silage, rye, barley, oat, forage, manure and fertilizer.

8. The agricultural monitoring system according to claim 1, wherein the memory is configured to contain information related to a stock state history, nutrient content, or both associated to the respective stock state in the stock state history for each source, target location, or both.

9. The agricultural monitoring system according to claim 1, wherein the user interface comprises input means for input of the material type of the material of a current activity.

10. The agricultural monitoring system according to claim 1,
    wherein each of the at least one work equipment has a work equipment communication interface connectable to a communication network, the communication network comprising the internet,
    wherein the memory is arranged at one of the work equipment or shared between a plurality of the work equipment and the at least one work equipment is arranged to transmit the information related to the nutrient flow to the memory via the communication network,
    or both.

11. The agricultural monitoring system according to claim 1,
wherein each of the at least one work equipment has a work equipment communication interface connectable to a communication network, the communication network comprising the internet, and
further comprising a remote data storage and processing system comprising a remote data storage and processing system communication interface connected to said communication network, said remote data storage and processing system being arranged to at least partly accommodate said memory or a copy thereof, wherein the at least one work equipment is arranged to transmit the information related to the nutrient flow to the memory accommodated in the remote data storage and processing system.

12. The agricultural monitoring system according to claim 1, further comprising an electronic user device comprising:
a electronic user device communication interface for communication with said at least one work equipment communication interface, said remote data storage and processing system communication interface, or both,
wherein the user interface is at least partly located at or integrated within the electronic user device,
wherein the control element is at least partly located at or integrated within the electronic user device,
or a combination thereof.

13. The agricultural monitoring system according to claim 1, wherein the user interface comprises a graphical user interface for display of the monitored nutrient flow, wherein the graphical user interface is arranged to display the nutrient flow between one or more source and target locations for example within a given time interval, to display a current nutrient content at one or a plurality of source, target locations, or a combination thereof, to present activities performed in relation to a nutrient flow from at least one source location to at least one target location, or a combination thereof.

14. The agricultural monitoring system according to claim 1, wherein said user interface is arranged to receive user input information related to the material type of the carried material.

15. The agricultural monitoring system according to claim 14,
wherein the user interface is arranged to present a plurality of pre-selectable material types,
wherein one or a plurality of selectable material handling activities is associated to each material type,
or both.

16. The agricultural monitoring system according to claim 1,
wherein said user interface is arranged to receive user input related to at least one material handling activity related to the carried material, and wherein the information related to the nutrient flow transmitted to the memory comprises an indication of said at least one material handling activity,
wherein the at least one material handling activity comprises at least one of bale handling, silage handling, grain handling, forage handling, manure handling, an fertilizer handling,
or both.

17. The agricultural monitoring system according to claim 16,
wherein the user interface is arranged to present a plurality of pre-selectable activities or activity chains, wherein each activity is associated to at least one selectable material type,
or both.

18. The agricultural monitoring system according to claim 1, wherein said user interface is arranged to receive user input for an activity target related to the weight, nutrient content, or both, wherein the control element is arranged to determine when the activity target has been reached, and wherein the user interface may be arranged to present information that the target has been reached by means of the user interface.

19. The agricultural monitoring system according to claim 12,
wherein the control element is located at or integrated within the work equipment, remote data storage and processing system, the electronic user device, or a combination thereof,
wherein the user interface is located at or integrated within the work equipment, the remote data storage and processing system, the electronic user device, or a combination thereof,
or both.

20. The agricultural monitoring system according to claim 1, wherein at least one of said at least one work equipment is a work vehicle having a fastener for releasable fastening of an implement;
an implement having an elongated arm, the arm having a fastening arrangement arranged at a first part of the elongated arm, said fastening arrangement being adapted for releasable fastening to said fastener; and
an attachment arrangement connected to a second part of the elongated arm, said attachment arrangement being adapted for releasable attachment of a work tool;
a first work tool;
said at least one implement further having a first hydraulic cylinder which, when actuated, is adapted to cause the implement to carry out a first function, the first function comprising movement of the elongated arm in relation to the first work vehicle when the implement is attached to the first work vehicle; and
a first sensor adapted to generate a first signal indicative of a hydraulic pressure in said first hydraulic cylinder when said first hydraulic cylinder is actuated.

21. The agricultural monitoring system according to claim 20, wherein the control element is at least partly arranged at the implement.

22. The agricultural monitoring system according to claim 1, wherein the target location is different from the source location.

23. A work equipment for performing agricultural activities, wherein the work equipment is arranged to carry material of at least one material type, and wherein the work equipment comprises:
a weight detection element arranged to detect a weight of a the carried material; and
a control element arranged to
receive from the weight detection element a weight related to the carried material,
determine the nutrient content of the captured material based on the detected weight and based on at least one nutrient content parameter value associated with the carried material, receive information related to a source location and a target location for the carried material, and
transmit information related to the nutrient flow to a memory, said information related to the nutrient flow comprising the source location, the target location, information related to the material determined nutrient content of the carried material and preferably the material type of the carried material, wherein the carried material is associated with a nutrient content parameter comprising at least one of the following: crude protein, acid detergent fiber, neutral detergent fiber, crude fat, ash, starch, nitrogen, phosphorus or potassium, and wherein the at least one nutrient content parameter value is selected based on user input, obtained sensor data and possible processing thereof or intelligence based on collected data, or a combination thereof.

24. The work equipment according to claim 23 comprising an implement attachable to the work equipment, wherein the implement comprises at least a part of the control element.

25. An implement attachable to work equipment for performing agricultural transporting activities, wherein the implement is arranged to transport material of one or a plurality of material types, and wherein said implement comprises a weight detection element arranged to detect a weight of the carried material; and a control element arranged to receive from the weight detection element a weight related to the carried material, determine the nutrient content of the captured material based on the detected weight and based on at least one nutrient content parameter value associated with the carried material, receive information related to a source location and a target location for the carried material, and transmit information to the memory related to the movement of the nutrient flow, said information comprising the source location, the target location, and information related to the material type and nutrient content of the carried material, wherein the carried material is associated with a nutrient content parameter comprising at least one of the following: crude protein, acid detergent fiber, neutral detergent fiber, crude fat, ash, starch, nitrogen, phosphorus and potassium, and wherein the at least one nutrient content parameter value is selected based on user input, obtained sensor data and possible processing thereof or intelligence based on collected data, or a combination thereof.

26. The implement according to claim 25, wherein the implement is a loader.

27. The implement according to claim 25, wherein the implement is a front loader.

28. A control element arranged to receive from a weight detection element a detected weight related to a carried material of a material type, determine a nutrient content of the captured material based on the detected weight and based on at least one nutrient content parameter value associated with the carried material, receive information related to a source location and a target location for the carried material, and form information related to a nutrient flow, said information comprising the source location, the target location, information related to the determined nutrient content of the carried material, and preferably material type of the carried material, wherein the carried material is associated with a nutrient content parameter comprising at least one of the following:

crude protein, acid detergent fiber, neutral detergent fiber, crude fat, ash, starch, nitrogen, phosphorus and potassium, and wherein the at least one nutrient content parameter value is selected based on user input, obtained sensor data and possible processing thereof or intelligence based on collected data, or a combination thereof.

29. A method for monitoring a nutrient flow within an agricultural site, said method being computer implemented and comprising the steps of:

obtaining information related to a source location and a target location for the carried material, detecting a weight related to the carried material of a known material type, determining a nutrient content of the captured material based on the detected weight and based on at least one predetermined nutrient content parameter value associated with the carried material, and forming information related to the nutrient flow, said information comprising the source location, the target location, information related to the determined nutrient content of the carried material, and preferably material type of the carried material, wherein the carried material is associated with a nutrient content parameter comprising at least one of the following:

crude protein, acid detergent fiber, neutral detergent fiber, crude fat, ash, starch, nitrogen, phosphorus and potassium, and wherein the at least one predetermined nutrient content parameter value is selected based on user input, obtained sensor data and possible processing thereof or intelligence based on collected data, or a combination thereof.

30. The method according to claim 29, wherein the step of forming information related to the nutrient flow comprises comprising the detected weight in the information.

31. The method according to claim 29, further comprising at least one of:

a step of transmitting the formed information related to the nutrient flow to a memory arranged to store a plurality of defined locations located within the agricultural site, wherein each defined location is associated with a geographical coordinate, a geographical zone, or both, and wherein the memory further being arranged to, for each location, store information related to a current nutrient stock state related to said at least one material type; and a step of, upon reception of information related to the nutrient flow, for the respective source and target location, update the memory content with the received information related to the nutrient flow.

32. The method according to claim 29, wherein the source location being one or a plurality of the defined locations and said target location being one or a plurality of the defined locations.

* * * * *